US011072526B2

(12) United States Patent
Fan et al.

(10) Patent No.: US 11,072,526 B2
(45) Date of Patent: Jul. 27, 2021

(54) CHEMICAL LOOPING SYNGAS PRODUCTION FROM CARBONACEOUS FUELS

(71) Applicant: OHIO STATE INNOVATION FOUNDATION, Columbus, OH (US)

(72) Inventors: Liang-shih Fan, Columbus, OH (US); Abbey Empfield, Albany, OR (US); Mandar Kathe, Columbus, OH (US); Charles Fryer, Chesterland, OH (US); Elena Blair, Oconomowoc, WI (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 16/091,253

(22) PCT Filed: Apr. 12, 2017

(86) PCT No.: PCT/US2017/027241
§ 371 (c)(1),
(2) Date: Oct. 4, 2018

(87) PCT Pub. No.: WO2017/180763
PCT Pub. Date: Oct. 19, 2017

(65) Prior Publication Data
US 2019/0152778 A1  May 23, 2019

Related U.S. Application Data

(60) Provisional application No. 62/321,607, filed on Apr. 12, 2016.

(51) Int. Cl.
*C01B 3/42* (2006.01)
*C10J 3/57* (2006.01)
(Continued)

(52) U.S. Cl.
CPC ............ *C01B 3/42* (2013.01); *B01J 8/12* (2013.01); *B01J 8/32* (2013.01); *B01J 8/388* (2013.01);
(Continued)

(58) Field of Classification Search
USPC ........................................................ 423/651
See application file for complete search history.

(56) References Cited

U.S. PATENT DOCUMENTS 971,206 A 9/1910 Messerschmitt
1,078,686 A 11/1913 Lane
(Continued)

FOREIGN PATENT DOCUMENTS

CN 1329761 1/2001
CN 1325319 A 12/2001
(Continued)

OTHER PUBLICATIONS

Pfeifer, "Industrial furnaces-status and research challenges," Energy Procedia, 2017, 120: 28-40.
(Continued)

*Primary Examiner* — Douglas B Call
(74) *Attorney, Agent, or Firm* — Michael Best & Friedrich LLP

(57) ABSTRACT

A reactor configuration is proposed for selectively converting gaseous, liquid or solid fuels to a syngas specification which is flexible in terms of $H_2/CO$ ratio. This reactor and system configuration can be used with a specific oxygen carrier to hydro-carbon fuel molar ratio, a specific range of operating temperatures and pressures, and a co-current downward moving bed system. The concept of a $CO_2$ stream injected in-conjunction with the specified operating parameters for a moving bed reducer is claimed, wherein the
(Continued)

injection location in the reactor system is flexible for both steam and $CO_2$ such that, carbon efficiency of the system is maximized.

10 Claims, 21 Drawing Sheets

(51) Int. Cl.
| | |
|---|---|
| *B01J 8/12* | (2006.01) |
| *B01J 8/38* | (2006.01) |
| *B01J 19/18* | (2006.01) |
| *C01B 3/56* | (2006.01) |
| *B01J 8/32* | (2006.01) |
| *C01B 3/34* | (2006.01) |
| *C10J 3/26* | (2006.01) |
| *C10J 3/72* | (2006.01) |

(52) U.S. Cl.
CPC ........... *B01J 19/1837* (2013.01); *C01B 3/344* (2013.01); *C01B 3/56* (2013.01); *C10J 3/26* (2013.01); *C10J 3/57* (2013.01); *C10J 3/721* (2013.01); *C10J 3/725* (2013.01); *B01J 2208/0038* (2013.01); *C01B 2203/0216* (2013.01); *C01B 2203/0222* (2013.01); *C01B 2203/0255* (2013.01); *C01B 2203/0475* (2013.01); *C01B 2203/1241* (2013.01); *C01B 2203/141* (2013.01); *C01B 2203/148* (2013.01); *C01B 2203/1614* (2013.01); *C01B 2203/1628* (2013.01); *C10J 2300/1612* (2013.01); *C10J 2300/1815* (2013.01); *C10J 2300/1823* (2013.01)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A | 5/1968 | Kitagawa |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,801,661 A | 4/1974 | Hart et al. |
| 3,879,514 A | 4/1975 | Dahl |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A | 4/1979 | Gidaspow et al. |
| 4,155,832 A | 5/1979 | Cox et al. |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 5,130,106 A | 7/1992 | Koves et al. |
| 5,365,560 A | 11/1994 | Tam |
| 5,447,024 A | 9/1995 | Ishida et al. |
| 5,456,807 A | 10/1995 | Wachsman |
| 5,509,362 A | 4/1996 | Lyon |
| 5,518,187 A | 5/1996 | Bruno et al. |
| 5,529,599 A | 6/1996 | Calderon |
| 5,584,615 A | 12/1996 | Micklich |
| 5,630,368 A | 5/1997 | Wagoner |
| 5,730,763 A | 3/1998 | Manulescu et al. |
| 5,770,310 A | 6/1998 | Noguchi et al. |
| 5,827,496 A | 10/1998 | Lyon |
| 5,858,210 A | 1/1999 | Richardson |
| 5,965,098 A | 10/1999 | Boegner et al. |
| 6,007,699 A | 12/1999 | Cole |
| 6,030,589 A | 2/2000 | Hartweg et al. |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 | 1/2003 | Jain et al. |
| 6,509,000 B1 | 1/2003 | Choudhary et al. |
| 6,517,631 B1 | 2/2003 | Bland |
| 6,607,704 B2 | 8/2003 | Guttridge et al. |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 6/2006 | Fan et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 | 11/2014 | Fan et al. |
| 9,017,627 B2 | 4/2015 | Gupta |

(56) References Cited

U.S. PATENT DOCUMENTS

| | | | |
|---|---|---|---|
| 9,290,386 B2 | 3/2016 | Wasas | |
| 9,376,318 B2 | 6/2016 | Fan et al. | |
| 9,382,359 B2 | 7/2016 | Kanellopoulos et al. | |
| 9,518,236 B2 | 12/2016 | Fan et al. | |
| 9,573,118 B2 | 2/2017 | Colozzi et al. | |
| 9,616,403 B2 | 4/2017 | Fan et al. | |
| 9,777,920 B2 | 10/2017 | Fan et al. | |
| 9,903,584 B2 | 2/2018 | Fan et al. | |
| 2001/0055559 A1 | 12/2001 | Sanfilippo et al. | |
| 2002/0011428 A1 | 1/2002 | Scheuerman | |
| 2002/0059864 A1 | 5/2002 | Janssen et al. | |
| 2002/0179887 A1 | 12/2002 | Zeng et al. | |
| 2003/0006026 A1 | 1/2003 | Matsumoto et al. | |
| 2003/0024388 A1 | 2/2003 | Scharpf | |
| 2003/0031291 A1 | 2/2003 | Yamamoto et al. | |
| 2003/0119658 A1 | 6/2003 | Allison et al. | |
| 2003/0124041 A1 | 7/2003 | Neumann et al. | |
| 2003/0130360 A1 | 7/2003 | Kindig et al. | |
| 2003/0153632 A1 | 8/2003 | Wang et al. | |
| 2003/0180215 A1 | 9/2003 | Niu et al. | |
| 2003/0188668 A1 | 10/2003 | Bland | |
| 2004/0028181 A1 | 2/2004 | Charles, Jr. et al. | |
| 2004/0030214 A1 | 2/2004 | Schindler et al. | |
| 2004/0092784 A1 | 5/2004 | Legendre | |
| 2004/0109800 A1 | 6/2004 | Pahlman et al. | |
| 2004/0126293 A1 | 7/2004 | Geerlings et al. | |
| 2004/0131531 A1 | 7/2004 | Geerlings et al. | |
| 2004/0132833 A1 | 7/2004 | Espinoza et al. | |
| 2004/0138060 A1 | 7/2004 | Rapier et al. | |
| 2004/0152790 A1 | 8/2004 | Cornaro et al. | |
| 2004/0154223 A1 | 8/2004 | Powell et al. | |
| 2004/0197612 A1 | 10/2004 | Keefer et al. | |
| 2004/0213705 A1 | 10/2004 | Blencoe et al. | |
| 2004/0233191 A1 | 11/2004 | Mukherjee et al. | |
| 2004/0244289 A1 | 12/2004 | Morozumi et al. | |
| 2004/0265224 A1 | 12/2004 | Papavassiliou et al. | |
| 2005/0002847 A1 | 1/2005 | Maroto-Valer et al. | |
| 2005/0054880 A1 | 3/2005 | Dubois et al. | |
| 2005/0175533 A1 | 8/2005 | Thomas et al. | |
| 2005/0255037 A1 | 11/2005 | Otsuka et al. | |
| 2005/0265912 A1 | 12/2005 | Alvarez, Jr. et al. | |
| 2005/0274648 A1 | 12/2005 | Goldstein et al. | |
| 2006/0021308 A1 | 2/2006 | Merkel | |
| 2006/0042565 A1 | 3/2006 | Hu | |
| 2006/0094593 A1 | 5/2006 | Beech, Jr. et al. | |
| 2007/0010588 A1 | 1/2007 | Pearson | |
| 2007/0049489 A1 | 3/2007 | Becue et al. | |
| 2007/0117714 A1 | 5/2007 | Geyer et al. | |
| 2007/0157517 A1 | 7/2007 | Tsay et al. | |
| 2007/0258878 A1 | 11/2007 | Sanfilippo et al. | |
| 2008/0031809 A1 | 2/2008 | Norbeck et al. | |
| 2008/0161624 A1 | 7/2008 | Glover et al. | |
| 2008/0164443 A1 | 7/2008 | White et al. | |
| 2008/0209807 A1 | 9/2008 | Tsangaris et al. | |
| 2008/0314838 A1 | 12/2008 | Becker et al. | |
| 2009/0000194 A1 | 1/2009 | Fan et al. | |
| 2009/0042070 A1 | 2/2009 | Brown et al. | |
| 2009/0160461 A1 | 6/2009 | Zangl et al. | |
| 2010/0071262 A1 | 3/2010 | Robinson et al. | |
| 2010/0119419 A1 | 5/2010 | Sprouse et al. | |
| 2010/0184589 A1 | 7/2010 | Miyairi et al. | |
| 2010/0187159 A1 | 7/2010 | Naunheimer | |
| 2010/0258429 A1 | 10/2010 | Ugolin | |
| 2010/0293845 A1 | 11/2010 | Zeman et al. | |
| 2010/0332170 A1 | 12/2010 | Gao et al. | |
| 2011/0005395 A1 | 1/2011 | Vimalchand et al. | |
| 2011/0011720 A1 | 1/2011 | Rinker | |
| 2011/0024687 A1 | 2/2011 | White et al. | |
| 2011/0054049 A1 | 3/2011 | Lambert et al. | |
| 2011/0094226 A1 | 4/2011 | McHugh et al. | |
| 2011/0100274 A1 | 5/2011 | Kuske et al. | |
| 2011/0138788 A1 | 6/2011 | Kanda et al. | |
| 2011/0146152 A1 | 6/2011 | Vimalchand et al. | |
| 2011/0176968 A1 | 7/2011 | Fan et al. | |
| 2011/0176988 A1 | 7/2011 | Okamura et al. | |
| 2011/0206469 A1 | 8/2011 | Furuyama et al. | |
| 2011/0289845 A1 | 12/2011 | Davis et al. | |
| 2011/0291051 A1 | 12/2011 | Hershkowitz et al. | |
| 2011/0300060 A1 | 12/2011 | Guillou et al. | |
| 2011/0303875 A1 | 12/2011 | Hoteit et al. | |
| 2012/0167585 A1 | 7/2012 | Wormser | |
| 2012/0171588 A1 | 7/2012 | Fan et al. | |
| 2012/0214106 A1 | 8/2012 | Sit et al. | |
| 2013/0071314 A1 | 3/2013 | Gupta | |
| 2013/0085365 A1 | 4/2013 | Marashded et al. | |
| 2013/0149650 A1 | 6/2013 | Gauthier et al. | |
| 2013/0255272 A1 | 10/2013 | Ajhar et al. | |
| 2013/0261355 A1 | 10/2013 | Stamires | |
| 2014/0021028 A1 | 1/2014 | Paganessi et al. | |
| 2014/0034134 A1 | 2/2014 | Fan et al. | |
| 2014/0072917 A1* | 3/2014 | Fan | B01J 8/32 431/170 |
| 2014/0144082 A1 | 5/2014 | Fan et al. | |
| 2014/0275297 A1 | 9/2014 | Velazquez-Vargas et al. | |
| 2014/0295361 A1* | 10/2014 | Fan | F23C 10/04 431/170 |
| 2015/0238915 A1 | 8/2015 | Fan et al. | |
| 2015/0343416 A1 | 12/2015 | Fadhel et al. | |
| 2016/0002034 A1 | 1/2016 | Fan et al. | |
| 2016/0016800 A1 | 1/2016 | Noyes | |
| 2016/0023190 A1 | 1/2016 | Fan et al. | |
| 2016/0030904 A1 | 2/2016 | Fan et al. | |
| 2016/0268616 A1 | 9/2016 | Fan et al. | |
| 2016/0376512 A1 | 12/2016 | Fan et al. | |
| 2018/0296978 A1 | 10/2018 | Peck et al. | |
| 2018/0353933 A1 | 12/2018 | Wendland et al. | |
| 2019/0003704 A1 | 1/2019 | Aranda et al. | |

FOREIGN PATENT DOCUMENTS

| | | |
|---|---|---|
| CN | 1454711 | 11/2003 |
| CN | 1501534 | 6/2004 |
| CN | 101389734 | 3/2009 |
| CN | 101426885 | 5/2009 |
| CN | 102187153 | 9/2011 |
| CN | 102388005 A | 3/2012 |
| CN | 102612625 | 7/2012 |
| CN | 102639213 A | 8/2012 |
| CN | 102686301 A | 9/2012 |
| CN | 103468322 A | 12/2013 |
| DE | 102010028816 A1 | 11/2011 |
| EP | 0161970 | 11/1985 |
| EP | 1134187 | 9/2001 |
| EP | 1445018 | 8/2004 |
| EP | 1580162 | 9/2005 |
| EP | 1845579 | 10/2007 |
| EP | 1933087 | 6/2008 |
| EP | 2279785 A2 | 2/2011 |
| EP | 2441816 A1 | 4/2012 |
| EP | 2450420 | 5/2012 |
| EP | 2495030 A2 | 9/2012 |
| EP | 2515038 | 10/2012 |
| EP | 2601443 | 6/2013 |
| EP | 1976633 | 3/2014 |
| FR | 2924035 | 5/2009 |
| JP | H03-68898 A | 3/1991 |
| JP | H10249153 | 9/1998 |
| JP | 2006-502957 | 1/2006 |
| KR | 20060096609 A | 9/2006 |
| KR | 101364823 B1 | 2/2014 |
| TW | 406055 | 9/2000 |
| TW | 426728 | 3/2001 |
| WO | WO 1990/13773 | 11/1990 |
| WO | WO 1999/65097 | 12/1999 |
| WO | WO 2000/22690 | 4/2000 |
| WO | WO 2000/068339 | 11/2000 |
| WO | WO 2001/042132 | 6/2001 |
| WO | WO 2003/070629 | 8/2003 |
| WO | WO 2007/082089 | 7/2007 |
| WO | WO 2007/122498 | 11/2007 |
| WO | WO 2007/134075 | 11/2007 |
| WO | WO 2008/019079 | 2/2008 |
| WO | WO 2008/071215 | 6/2008 |
| WO | WO 2008/082312 | 7/2008 |

(56) References Cited

FOREIGN PATENT DOCUMENTS

| | | |
|---|---|---|
| WO | WO 2008/115076 | 9/2008 |
| WO | 2009/008565 A1 | 1/2009 |
| WO | WO 2009/007200 | 1/2009 |
| WO | WO 2009/009388 | 1/2009 |
| WO | WO 2009/021258 | 2/2009 |
| WO | WO 2009/023515 A2 | 2/2009 |
| WO | WO 2009/114309 | 9/2009 |
| WO | WO 2010/037011 | 4/2010 |
| WO | WO 2010/063923 | 6/2010 |
| WO | WO 2010/126617 | 11/2010 |
| WO | WO 2011/021161 | 2/2011 |
| WO | WO 2011/031752 | 3/2011 |
| WO | WO 2011/031755 | 3/2011 |
| WO | WO 2011/084734 | 7/2011 |
| WO | WO 2012/064712 | 5/2012 |
| WO | WO 2012/077978 | 6/2012 |
| WO | WO 2012/155054 | 11/2012 |
| WO | WO 2012/155059 | 11/2012 |
| WO | WO 2013/040645 | 3/2013 |
| WO | WO 2014/085243 | 6/2014 |
| WO | WO 2011/153568 | 12/2014 |
| WO | WO 2014/195904 | 12/2014 |
| WO | WO 2016/053941 | 4/2016 |
| WO | 2017/162427 A1 | 9/2017 |

OTHER PUBLICATIONS

Faezad Othman et al., "Utilization of Malaysian Low Grade Iron Ore as Medium for Ammonia Decomposition," ARPN Journal of Engineering and Applied Sciences, 2015, 10(22):17286-17288.

Faezad Othman et al., "Utilization of Low-Grade Iron Ore in Ammonia Decomposition," Procedia Chemistry, 2016, 19:119-124.

Mihai et al., "Chemical looping methane partial oxidation: The effect of the crystal size and O content of LaFeO3," Journal of Catalysis, 2012, 293:175-185.

Xu et al., "A novel chemical looping partial oxidation process for thermochemical conversion of biomass to syngas," Applied Energy, 2018, 222:119-131.

Kathe et al., "Modularization strategy for syngas generation in chemical ," AIChE Journal, 2017, 63(8):3343-3360.

International Search Report and Written Opinion for Application No. PCT/US2020/013823 dated Apr. 9, 2020 (16 pages).

United States Patent Office Action for U.S. Appl. No. 16/091,508 dated Feb. 12, 2020 (18 pages).

United States Patent Office Action for U.S. Appl. No. 16/216,911 dated Apr. 16, 2020 (6 pages).

International Search Report and Written Opinion for Application No. PCT/US2019/045438 dated Oct. 31, 2019 (9 pages).

United States Patent Office Notice of Allowance for U.S. Appl. No. 16/260,447 dated Oct. 21, 2019 (10 pages).

Abdallah et al., "Comparison of mesoporous silicate supports for the immobilisation and activity of cytochrome c and lipase," J. Mol. Catal. B: Enzym., 2014, 108, 82-88.

Ahern et al., "Comparison of fenofibratemesoporous silica drug-loading processes for enhanced drug delivery," Eur. J. Pharm. Sci., 2013, 50, 400-409.

Alalwan et al., "Co3O4 nanoparticles as oxygen carriers for chemical looping combustion: A materials characterization approach to understanding oxygen carrier performance," Chemical Engineering Journal, 2017, 319, 279-287.

Alalwan et al., "α-Fe2O3 Nanoparticles as Oxygen Carriers for Chemical Looping Combustion: An Integrated Materials Characterization Approach to Understanding Oxygen Carrier Performance, Reduction Mechanism, and Particle Size Effects," Energy Fuels, 2018, 32, 7959-7970.

Anisimov et al., "Density-functional calculation of effective Coulomb interactions in metals," Phys. Rev. B, 1991, 43, 7570.

Barreca et al., "Methanolysis of styrene oxide catalysed by a highly efficient zirconium-doped mesoporous silica," Appl. Catal. A, 2006, 304, 14-20.

Burke et al., "Large pore bi-functionalised mesoporous silica for metal ion pollution treatment," J. Hazard. Mater., 2009, 164, 229-234.

Cheng et al., "Oxygen vacancy promoted methane partial oxidation over iron oxide oxygen carrier in chemical looping process," Phys. Chem. Chem. Phys., 2016, 18, 32418-32428.

Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.

Coleman et al., "Synthesis and characterization of dimensionally ordered semiconductor nanowires within mesoporous silica," J. Am. Chem. Soc., 2001, 123, 7010-7016.

Delaney et al., "Development of chemically engineered porous metal oxides for phosphate removal," J. Hazard. Mater., 2011, 185, 382-391.

Delaney et al., "Porous silica spheres as indoor air pollutant scavengers," J. Environ. Monit., 2010, 12, 2244-2251.

Flynn et al., "Pervaporation performance enhancement through the incorporation of mesoporous silica spheres into PVA membranes," Sep. Purif. Technol., 2013, 118, 73-80.

Ghoneim et al., "Review on innovative catalytic reforming of natural gas to syngas," World J. Eng. Technol, 2016, 4 (1):116-139.

Grimme et al., "A consistent and accurate ab initio parametrization of density functional dispersion correction (DFT-D) for the 94 elements H—Pu," J. Chem. Phys., 2010, 132, 19.

Grimme et al., "Effect of the damping function in dispersion corrected density functional theory," J. Comput. Chem., 2011, 32, 1456-1465.

Henkelman et al., "A climbing image nudged elastic band method for finding saddle points and minimum energy paths," J. Chem. Phys., 2000, 113, 9901-9904.

Herbst et al., "Relativistic calculations of 4f excitation energies in the rare-earth metals: Further results," Phys. Rev. B, 1978, 17, 3089.

Kresse et al., "Ab initio molecular dynamics for liquid metals," Phys. Rev. B, 1993, 47, 558.

Kresse et al., "Efficiency of ab-initio total energy calculations for metals and semiconductors using a plane-wave basis set," Comput. Mater. Sci., 1996, 6, 15-50.

Kresse et al., "Efficient iterative schemes for ab initio total-energy calculations using a plane-wave basis set," Phys. Rev. B, 1996, 54, 11169.

Kumar et al., "Direct air capture of CO2 by physisorbent materials," Angew. Chem., Int. Ed., 2015, 54, 14372-14377.

Niipattummakul et al., "Hydrogen and syngas production from sewage sludge via steam gasification," Fuel and Energy Abstracts, 2010, 35 (21), 11738-11745.

Perdew et al., "Generalized gradient approximation made simple," Phys. Rev. Lett., 1996, 77, 3865.

Qin et al., "Enhanced methane monversion in mhemical looping partial oxidation systems using a copper doping modification," Appl. Catal. B, 2018, 235, 143-149.

Rollmann et al., "First-principles calculation of the structure and magnetic phases of hematite," Phys. Rev. B, 2004, 69, 165107.

Sheppard et al., "Paths to which the nudged elastic band converges," J. Comput. Chem., 2011, 32, 1769-1771.

Speight, "Gasification processes for syngas and hydrogen production," Gasification for Synthetic Fuel Production, Woodhead Publishing, 2015, 119-146.

Sun et al., "Review: Fundamentals and challenges of electrochemical CO2 reduction using two-dimensional materials," Chem, 2017, 3, 560-587.

Zeng et al., "Metal oxide redox chemistry for chemical looping processe," Nat Rev Chem., 2018, 2, 349-364.

United States Patent Office Notice of Allowance for U.S. Appl. No. 15/685,951 dated Aug. 12, 2019 (5 pages).

United States Patent Office Notice of Allowance for U.S. Appl. No. 16/166,746 dated Aug. 15, 2019 (8 pages).

European Patent Office Extended Search Report for Application No. 17783069.2 dated Aug. 16, 2019 (12 pages).

United States Patent Office Notice of Allowance for U.S. Appl. No. 15/376,590 dated Jan. 9, 2019 (6 pages).

(56) References Cited

OTHER PUBLICATIONS

Rostrup-Nielsen, "Syngas in Perspective," Catalysis Today, 2002, 71(3-4), 243-247.
Takanabe, "Catalytic Conversion of Methane: Carbon Dioxide Reforming and Oxidative Coupling," Journal of the Japan Petroleum Institute, 2012, 55, 1-12.
Carrero et al., "A critical literature review of the kinetics for the oxidative dehydrogenation of propane over well-defined supported vanadium oxide catalysts," ACS Catalysis, 2014, 4: 3357-3380.
Cavani et al., "Oxidative dehydrogenation of ethane and propane: How far from commercial implementation?" Catalysis Today, 2007, 127(1): 113-131.
Koulialias et al., "Ordered defects in Fe 1-x S generate additional magnetic anisotropy symmetries," Journal of Applied Physics, 2018, 123(3): 033902, 10 pages.
Moreira, "Steam Cracking: Kinetics and Feed Characterization," Dissertation, 2015, 10 pages.
Wang et al., "Highly efficient metal sulfide catalysts for selective dehydrogenation of isobutane to isobutene," ACS Catalysis, 2014, 4: 1139-1143.
United States Patent Office Action for U.S. Appl. No. 15/685,951 dated May 14, 2019 (10 pages).
United States Patent Office Action for U.S. Appl. No. 16/166,746 dated May 1, 2019 (9 pages).
Sattler et al., "Catalytic Dehydrogenation of Light Alkanes on Metals and Metal Oxides," Chem Rev, 2014, 114(20): 10613-10653.
U.S. Appl. No. 13/394,572, filed Mar. 7, 2012, U.S. Pat. No. 9,371,227, Jun. 21, 2016.
U.S. Appl. No. 15/162,199, filed May 23, 2016, 2016/0268616, Sep. 15, 2016.
U.S. Appl. No. 13/394,396, filed Mar. 6, 2012, U.S. Pat. No. 9,518,236, Dec. 13, 2016.
U.S. Appl. No. 15/376,590, filed Dec. 12, 2016, 2017/0158964, Jun. 8, 2017.
U.S. Appl. No. 11/010,648, filed Dec. 13, 2004, U.S. Pat. No. 7,767,191, Aug. 30, 2010.
U.S. Appl. No. 13/121,009, filed Mar. 25, 2011, U.S. Pat. No. 8,877,147, Nov. 4, 2014.
U.S. Appl. No. 14/504,295, filed Oct. 1, 2014, U.S. Pat. No. 9,376,318, Jun. 28, 2016.
U.S. Appl. No. 15/191,249, filed Jun. 23, 2016, 2016/0376512, Dec. 29, 2016.
U.S. Appl. No. 13/883,795, filed Nov. 8, 2011, U.S. Pat. No. 10,010,847, Jul. 3, 2018.
U.S. Appl. No. 14/116,627, filed May 11, 2012, U.S. Pat. No. 9,777,920, Oct. 3, 2017.
U.S. Appl. No. 15/685,951, filed Aug. 24, 2017, 2017/0370573, Dec. 28, 2017.
U.S. Appl. No. 14/116,636, filed May 11, 2012, U.S. Pat. No. 9,903,584, Dec. 27, 2018.
U.S. Appl. No. 61/761,016, filed Feb. 5, 2013.
U.S. Appl. No. 61/779,243, filed Mar. 13, 2013.
U.S. Appl. No. 14/766,086, filed Feb. 5, 2014, U.S. Pat. No. 10,144,640, Dec. 4, 2018.
U.S. Appl. No. 16/166,746, filed Oct. 22, 2018, WO2014/124011, Aug. 14, 2014.
U.S. Appl. No. 61/779,408, filed Mar. 13, 2013.
U.S. Appl. No. 14/775,044, filed Mar. 13, 2014, 2016/0030904, Feb. 4, 2016, WO2014/159956, Oct. 2, 2014.
U.S. Appl. No. 61/781,452, filed Mar. 14, 2013, WO2014/152814, Sep. 25, 2014.
U.S. Appl. No. 61/779,070, filed Mar. 14, 2013.
U.S. Appl. No. 14/774,727, filed Mar. 13, 2014, 2016/0023190, Jan. 28, 2016.
U.S. Appl. No. 15/919,748, filed Mar. 13, 2018, WO/2014/160223, Oct. 2, 2014.
U.S. Appl. No. 61/782,526, filed Mar. 14, 2013.
U.S. Appl. No. 14/774,730, filed Mar. 13, 2014, U.S. Pat. No. 9,616,403, Jan. 21, 2016.
PCT/US2014/028217, Mar. 14, 2014.
U.S. Appl. No. 61/875,418, filed Sep. 9, 2013.
U.S. Appl. No. 61/875,425, filed Sep. 9, 2013.
U.S. Appl. No. 12/160,803, filed Jul. 14, 2008, 2009/0000194, Jan. 1, 2009.
U.S. Appl. No. 14/091,654, filed Nov. 27, 2013, 2014/0144082, May 29, 2014.
U.S. Appl. No. 13/644,973, filed Oct. 4, 2012, 2013/0085365, Apr. 4, 2013.
U.S. Appl. No. 61/945,257, filed Feb. 27, 2014.
U.S. Appl. No. 62/041,703, filed Aug. 26, 2014.
U.S. Appl. No. 14/634,319, filed Feb. 27, 2015, 2015/0238915, Aug. 27, 2015.
U.S. Appl. No. 15/647,084, filed Jul. 11, 2017, U.S. Pat. No. 10,022,693, Jul. 17, 2018, WO2015/131117, Sep. 3, 2015.
U.S. Appl. No. 62/341,294, filed May 25, 2016.
U.S. Appl. No. 16/091,508, filed Oct. 4, 2018, WO2017/205638, Nov. 30, 2017.
U.S. Appl. No. 62/519,376, filed Jun. 14, 2017.
U.S. Appl. No. 62/546,886, filed Aug. 17, 2017.
U.S. Appl. No. 62/539,374, filed Jul. 31, 2017.
U.S. Appl. No. 62/565,565, filed Sep. 29, 2017.
U.S. Appl. No. 62/589,144, filed Nov. 21, 2017.
PCT/US2018/044530, Jul. 31, 2018.
U.S. Appl. No. 62/623,355, filed Jan. 29, 2018.
U.S. Appl. No. 62/716,705, filed Aug. 9, 2018.
U.S. Appl. No. 62/734,387, filed Sep. 21, 2018.
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of Cu-, Ni-, and Fe-Based Oxygen Carriers Using Syngas (CO+H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Adanez et al., "Selection of oxygen carriers for chemical-looping combustion," Energy & Fuels, American Chemical Society, 2004, vol. 18, No. 2, pp. 371-377.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Bell et al., "H2 Production via Ammonia Decomposition Using Non-Noble Metal Catalysts: A Review," Top Catal, 2016, 59, 1438-1457.
Cao et al., "Investigation of Chemical Looping Combustion by Solid Fuels. 1. Process Analysis," Energy Fuels, 2006, 20(5), pp. 1836-1844.
Cheng et al., "Carbon Dioxide Adsorption and Activation on Ceria (110): A density functional theory study," J. Chem. Phys. 2013, 138, 014702.
Cheng et al., "Methane Adsorption and Dissociation on Iron Oxide Oxygen Carrier: Role of Oxygen Vacancy," Phys. Chem. Chem. Phys. 2016, 18, 16423-16435.
Cheng et al., "Propagation of Olefin Metathesis to Propene on WO3 Catalysts: A Mechanistic and Kinetic Study," ACS Catal. 2015, 5, 59-72.
Cho et al., "Comparison of iron-, nickel-, copper- and manganese-based oxygen carriers for chemical-looping combustion," Fuel, 2004, vol. 83, Issue 9, pp. 1215-1225.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.
De Diego et al., "Development of Cu-based oxygen carriers for chemical-looping combustion," Fuel, 2004, vol. 83, Issue 13, pp. 1749-1757.

(56) References Cited

OTHER PUBLICATIONS

De Klerk, "Gas-to-Liquid Conversion" Natural Gas Conversion Technologies Workshop of ARPA-E. U.S. Department of Energy, Houston, TX. vol. 13 (2012).
Denton et al., "Simultaneous Production of High-Purity Hydrogen and Sequestration-Ready CO2 from Syngas," 2003.
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Environmental Protection Agency, "Geological CO2 Sequestration Technology and Cost Analysis," Technical Support Document, pp. i-vi & pp. 1-61, Jun. 2008.
Fan et al., "Chemical looping processes for CO2 capture and carbonaceous fuel conversion prospect and opportunity," Energy Environmental Science, 2012, p. 7254-7280.
Fan et al., "Utilization of chemical looping strategy in coal gasification processes," Particuology, 2008, vol. 6, Issue 3, pp. 131-142.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Forzatti, "Present status and perspectives in de-NOx SCR catalysis." Appl. Catal. A: Gen., 222(1-2), 2001, 221-236.
Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Go et al., "Hydrogen production from two-step steam methane reforming in a fluidized bed reactor," International Journal of Hydrogen Energy, 2009, vol. 34, p. 1301-1309.
Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).
Haque, "Microwave energy for mineral treatment processes—a brief review," International Journal of Mineral Processing vol. 57, pp. 1-24, 1999.
Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2 separations—a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing Ltd, vol. 10, pp. 717-725.
Huijgen et al., "Carbon dioxide sequestrationby mineral carbonation," ECN-C-03--016, www.ecn.nl/docs/library/report/200e/c03016.pdf, Feb. 2003.
Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).
Imanaka et al., "Advances in Direct NOx Decomposition Catalysts," Appl. Catal. A: Gen., 431-432, 2012, 1-8.
Ishida et al., "Evaluation of a Chemical-Looping-Combustion Power-Generation System by Graphic Exergy Analysis," Energy, 12(2), 147-154 (1987).
Iwamoto et al., "Influence of sulfur dioxide on catalytic removal of nitric oxide over copper ion-exchanged ZSM-5 Zeolite." Appl. Catal., 69(2), 1991, 15-19.
Izquierdo et al., "Catalyst Deactivation and Regeneration Processes in Biogas Tri-Reforming Process. The Effect of Hydrogen Sulfide Addition," Catalysts, 2018, 8(12): 19 pages.
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of CoO—NiO," Energy & Fuels, 1998, vol. 12, 1272-1277.
Johansson et al., "Combustion of Syngas and Natural Gas in a 300 W Chemical-Looping Combustor," Chemical Engineering Research and Design Volume, 2006, vol. 84, Issue 9, pp. 819-827.
Kaiser et al., "Precombustion and Postcombustion Decarbonization," IEEE, Power Engineering Review, Apr. 2001, pp. 15-17.
Kathe et al., "Chemical Looping Gasification for Hydrogen Enhanced Syngas Production with in-situ CO2. Capture," United States Department of Energy, OSTI: 1185194, (2015).
Kiuchi et al., "Recovery of hydrogen from hydrogen sulfide with metals or metal sulfides," Int. J. Hydrogen Energy, 1982, 7: 477-482.
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Clean coal conversion processes—progress and challenges," The Royal Society of Chemistry, Energy & Environmental Science, Jul. 30, 2008, vol. 1, pp. 248-267.
Li et al., "Ionic Diffusion in the Oxidation of Iron-effect of Support and Its Implications to Chemical Looping Applications," Energy Environ. Sci. 2011, 4, 876-880.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AIChE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Liu et al., "Enhanced Performance of Alkali Metal Doped Fe2O3 and Fe2O3/Al2O3 Composites as Oxygen. Carrier Material in Chemical Looping Combustion," Energy Fuels. 2013, 27, 4977-4983.

(56) References Cited

OTHER PUBLICATIONS

Liu et al., "Recent Advances in Catalytic DeNOx Science and Technology," Catalysis Reviews, 48(1), 2006, 43-89.

Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).

Lyngfelt, "Chemical Looping Combustion of Solid Fuels—Status of Development," Applied Energy, 2014, vol. 113, p. 1869-1873.

Lyngfelt, "Oxygen Carriers for Chemical Looping Combustion Operational Experience," 1st International Conference on Chemical Looping, Mar. 2010.

Makepeace et. al., "Ammonia decomposition catalysis using non-stoichiometric lithium imide," Chem. Sci., 2015, 6, 3805.

Mannan et al., "Simultaneous steam and CO2 reforming of methane to syngas over NiO/MgO/SA-5205 in presence and absence of oxygen," Applied Catalysis A, 1998, vol. 168, p. 33-46.

Mao et al., "Facile synthesis of phase-pure $FeCr_2Se_4$ and $FeCr_2S_4$ nanocrystals via a wet chemistry method," J. Mater. Chem. C, 2014, 2: 3744-3749.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Masui et al.,"Direct Decomposition of NO into N2 and O2 Over C-type Cubic $Y2O3—Tb4O7—ZrO2$," Materials Sciences and Applications, 3(10), 2012, 733-738.

Mattisson et al., "Application of chemical-looping combustion with capture of CO2," Second Nordic Minisymposium on Carbon Dioxide Capture and Storage, Goeteborg, Oct. 26, 2001, pp. 46-51.

Mattisson et al., "Chemical-looping combustion using syngas as fuel," International Journal of Greenhouse Gas control, 2007, vol. 1, Issue 2, pp. 158-169.

Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.

Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.

Mattisson et al., "The use of iron oxide as an oxygen carrier in chemical-looping combustion of methane with inherent separation of CO2," Fuel, 2001, vol. 80, pp. 1953-1962.

Mattisson et al., "Use of Ores and Industrial Products As Oxygen Carriers in Chemical-Looping Combustion," Energy & Fuels, 2009, vol. 23, pp. 2307-2315.

Miller et al., "Toward Transformational Carbon Capture," AIChE Journal, 62, 1-10 (2016).

NETL, National Energy Technology Laboratory. U.S. Department of Energy, "Quality Guidelines for Energy System Studies—Specification for Selected Feedstocks." Jan. 2012.

NETL, National Energy Technology Laboratory. U.S. Department of Energy, "Syngas Contaminant Removal and Conditioning," webpage accessed on Jul. 8, 2018.

Ockwig et al., "Membranes for Hydrogen Separation," American Chemical Society, Chem. Rev., Oct. 10, 2007, vol. 107, pp. 4078-4110.

O'Connor et al., "Carbon Dioxide Sequestration by Direct Mineral Carbonation: Results from Recent Studies and Currents Status," Abstract, USDOE Office of Fossil Energy, 2001.

Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).

Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.

OSHA, "Hydrogen Sulfide in Workplaces," <https://www.osha.gov/SLTC/hydrogensulfide/hydrogensulfide_found.html> webpage accessed Jul. 8, 2018.

Park et al., "CO2 Mineral Sequestration: Chemically Enhanced Aqueous Carbonation of Serpentine," The Canadian Journal of Chemical Engineering, 2003, vol. 81, pp. 885-890.

Park et al., "CO2 Mineral Sequestration: physically activated dissolution of serpentine and pH swing process," Chemical Engineering Science, 2004, vol. 59, pp. 5241-5247.

Pröll et al., "Syngas and a separate nitrogen/argon stream via chemical looping reforming—A 140 kW pilot plant study," Fuel, 2010, vol. 89, Issue 6, pp. 1249-1256.

Qin et al., "Evolution of Nanoscale Morphology in Single and Binary Metal Oxide Microparticles During Reduction and Oxidation Processes," J. Mater. Chem. A. 2014, 2, 17511-17520.

Qin et al., "Impact of 1% Lanthanum Dopant on Carbonaceous Fuel Redox Reactions with an Iron-Based Oxygen Carrier in Chemical Looping Processes," ACS Energy Letters, 2017, 2, 70-74.

Qin et al., "Nanostructure Formation Mechanism and Ion Diffusion in Iron-Titanium Composite Materials with Chemical Looping Redox Reactions," J. Mater. Chem. A. 2015, 3, 11302-11312.

Quin et al., "Improved Cyclic redox reactivity of lanthanum modified iron-based oxygen carriers in carbon monoxide xhemical looping combustion," Journal of Materials Chemistry A, 2017, 8 pages.

Lin et al., "Carbon dioxide reforming of methane over nickel/alkaline earth metal oxide catalysts," Applied Catalysis A, 1995, vol. 133, p. 149-161.

Russo et al., "Impact of Process Design of on the Multiplicity Behavior of a Jacketed Exothermic CSTR," AIChE Journal, Jan. 1995, vol. 41, No. 1, pp. 135-147.

Ryden et al., "Synthesis gas generation by chemical-looping reforming in a continuously operating laboratory reactor," Fuel, 2006, vol. 85, p. 1631-1641.

Sassi et al., "Sulfur Recovery from Acid Gas Using the Claus Process and High Temperature Air Combustion ( HiTAC ) Technology," Am. J. Environ. Sci., 2008, 4, 502-511.

Scott et al., "In situ gasification of a solid fuel and CO2 separation using chemical looping," AIChE Journal, 2006, vol. 52, Issue 9, pp. 3325-3328.

Shen et al., "Chemical-Looping Combustion of Biomass in a 10kWth Reactor with Iron Oxide as an Oxygen Carrier," Energy & Fuels, 2009, vol. 23, pp. 2498-2505.

Shen et al., "Experiments on chemical looping combustion of coal with a NiO based oxygen carrier," Combustion and Flame, 2009, vol. 156, Issue 3, pp. 721-728.

Shick et al., "Single crystal growth of $CoCr_2S_4$ and $FeCr_2S_4$," Journal of Crystal Growth, 1969, 5(4): 313-314.

Sridhar et al., "Syngas Chemical Looping Process: Design and Construction of a 25 kWth Subpilot Unit," Energy Fuels, 2012, 26(4), pp. 2292-2302.

Steinfeld et al., "Design Aspects of Solar Thermochemical Engineering—A case Study: Two-Step Water-Splitting Cycle Using the Fe3O4/FeO Redox System," Solar Energy, 1999, pp. 43-53.

Steinfeld, "Solar hydrogen production via a two-step water-splitting thermochemical cycle based on Zn/ZnO redox reactions," International Journal of Hydrogen Energy, 2002, vol. 27, pp. 611-619.

Thiollier et al., "Preparation and Catalytic Properties of Chromium-Containing Mixed Sulfides," Journal of Catalysis, 2011, 197(1): 58-67.

Tian et al., "Thermodynamic investigation into carbon deposition and sulfur evolution in a Ca-based chemical-looping combustion system," Chemical Engineering Research & Design, 2011, vol. 89, Issue 9, p. 1524.

Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.

U.S. Department of Energy, NCCTI Energy Technologies Group, Office of Fossil Energy, "CO2 Capture and Storage in Geologic Formations," pp. 34, Revised Jan. 8, 2002.

(56) References Cited

OTHER PUBLICATIONS

United States Environmental Protection Agency. "Air Pollution Control Technology Fact Sheet: Selective Catalytic Reforming," <https://www3.epa.gov/ttncatc1/cica/files/fscr.pdf> (2003).
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Wang et al., Study of bimetallic interactions and promoter effects of FeZn, FeMn and FeCr Fischer—Tropsch synthesis catalysts Journal of Molecular Catalysis A: Chemical, 2010, 326:29-40.
Warsito, W. et al., Electrical Capacitance Volume Tomography, 2007, pp. 1-9.
Watanabe, "Electrical properties of $FeCr_2S_4$ and $CoCr_2S_4$," Solid State Communications, 1973, 12(5): 355-358.
Yamazaki et al., "Development of highly stable nickel catalyst for methane-steam reaction under low steam to carbon ratio," Applied Catalyst A, 1996, vol. 136, p. 49-56.
Yin et. al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
International Preliminary Report on Patentability for International Application PCT/US/2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated. Nov. 12, 2013.
International Preliminary Report on Patentability for International Application PCT/US/2012/037557 dated. Nov. 21, 2013.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.
International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
International Search Report and Written Opinion for Application No. PCT/US2017/027241 dated Jul. 10, 2017 (11 pages).
International Search Report and Written Opinion for Application No. PCT/US2017/034503 dated Aug. 15, 2017 (14 pages).
International Search Report and Written Opinion for Application No. PCT/US2018/044530 dated Oct. 17, 2018 (13 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Notice of Allowance for U.S. Appl. No. 13/394,396 dated Aug. 3, 2016 (8 pages).
United States Patent Office Action for U.S. Appl. No. 15/376,590 dated Mar. 9, 2018 (10 pages).
United States Patent Office Action for U.S. Appl. No. 15/376,590 dated Oct. 19, 2018 (8 pages).
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action pertaining to U.S. Appl. No. 13/121,009 dated Sep. 6, 2012.
United States Patent Office Notice of Allowance for U.S. Appl. No. 14/504,295 dated Sep. 28, 2015 (10 pages).
United States Patent Office Action for U.S. Appl. No. 15/191,249 dated Dec. 28, 2017 (14 pages).
United States Patent Office Notice of Allowance for U.S. Appl. No. 15/191,249 dated May 22, 2018 (8 pages).
United States Patent Office Action for U.S. Appl. No. 13/883,795 dated Jun. 20, 2016 (15 pages).
United States Patent Office Action for U.S. Appl. No. 13/883,795 dated Jun. 23, 2017 (11 pages).
United States Patent Office Notice of Allowance for U.S. Appl. No. 13/883,795 dated Jan. 22, 2018 (7 pages).
United States Patent Office Action for U.S. Appl. No. 14/116,627 dated Oct. 20, 2016 (6 pages).
United States Patent Office Notice of Allowance for U.S. Appl. No. 14/116,627 dated Mar. 10, 2017 (5 pages).
United States Patent Office Notice of Allowance for U.S. Appl. No. 14/116,627 dated Jun. 14, 2017 (5 pages).
United States Patent Office Final Rejection for U.S. Appl. No. 14/116,636 dated Oct. 24, 2016 (10 pages).
United States Patent Office Notice of Allowance for U.S. Appl. No. 14/116,636 dated Nov. 7, 2017 (5 pages).
United States Patent Office Action for U.S. Appl. No. 14/766,086 dated Jan. 13, 2017 (22 pages).
United States Patent Office Action for U.S. Appl. No. 14/766,086 dated Sep. 7, 2017 (19 pages).
United States Patent Office Action for U.S. Appl. No. 14/766,086 dated Jan. 2, 2018 (21 pages).
United States Patent Office Notice of Allowance for U.S. Appl. No. 14/766,086 dated Aug. 8, 2018 (9 pages).

(56) References Cited

OTHER PUBLICATIONS

United States Patent Office Action for U.S. Appl. No. 14/775,044 dated May 30, 2017 (15 pages).
United States Patent Office Action for U.S. Appl. No. 14/775,044 dated Feb. 26, 2018 (16 pages).
United States Patent Office Action for U.S. Appl. No. 14/774,727 dated Sep. 14, 2017 (10 pages).
United States Patent Office Notice of Allowance for U.S. Appl. No. 14/774,730 dated Nov. 16, 2016 (10 pages).
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
United States Patent Office Action for U.S. Appl. No. 12/160,803 dated Feb. 23, 2016 (27 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Action for U.S. Appl. No. 14/634,319 dated Nov. 7, 2016 (7 pages).
United States Patent Office Action for U.S. Appl. No. 14/634,319 dated Apr. 11, 2017 (9 pages).
United States Patent Office Action for U.S. Appl. No. 15/647,084 dated Dec. 26, 2017 (7 pages).
United States Patent Office Notice of Allowance for U.S. Appl. No. 15/647,084 dated Mar. 19, 2018 (8 pages).
Lockwood Greene, "Ironmaking Process Alternative Screening Study, vol. I: Summary Report," Department pf Energy United States of America, Oct. 2000, 153 pages.
Goellner et al., "Baseline analysis of crude methanol production from coal and natural gas," National Energy Technology Laboratory (NETL), US Department of Energy, 2014, 83 pages.
Wang et al., "Isobutane Dehydrogenation over Metal (Fe, Co, and Ni) Oxide and Sulfide Catalysts: Reactivity and Reaction Mechanism," ChemCatChem, Jul. 2014, vol. 6, pp. 2305-2314.
International Search Report and Written Opinion for Application No. PCT/US2020/027324 dated Jul. 9, 2020 (10 pages).
United States Patent Office Action for U.S. Appl. No. 16/634,844 dated May 12, 2020 (8 pages).
United States Patent Office Action for U.S. Appl. No. 16/634,844 dated Aug. 31, 2020 (4 pages).
United States Patent Office Notice of Allowance for U.S. Appl. No. 16/216,911 dated Sep. 17, 2020 (8 pages).
Australian Patent Office Examination Report No. 1 for Application No. 2017250214 dated Oct. 8, 2020 (5 pages).
Lin et al., "Novel Magnetically Separable Mesoporous $Fe_2O_3$@SBA-15 Nanocomposite with Fully Open Mesochannels for Protein Immobilization," Chemistry of Materials, 2008, vol. 20, pp. 6617-6622.
International Search Report and Written Opinion for Application No. PCT/US2020/046918 dated Nov. 24, 2020 (12 pages).
Chinese Patent Office Action for Application No. 201780023280.X dated Nov. 3, 2020 (21 pages, English translation included).
Australian Patent Office Examination Report No. 1 for Application No. 2017250214 dated Mar. 1, 2021 (6 pages).

\* cited by examiner

CHEMICAL LOOPING SYNGAS PRODUCTION FROM CARBONACEOUS FUELS

CROSS-REFERENCE TO RELATED APPLICATIONS

This application is a U.S. national stage entry of International Patent Application No. PCT/US2017/027241, filed on Apr. 12, 2017, which claims priority to U.S. Provisional Application No. 62/321,607, filed Apr. 12, 2016, the entire contents of each of which are fully incorporated herein by reference.

BACKGROUND

Increased natural gas availability in the United States has presented an opportunity to decrease dependence on foreign oil (which constitutes 27% of the total consumption[1]), and diversify the supply for energy consumption needs. Turbulence in the oil market is seen as a driving force for the advancement of Gas to Liquids (GTL) technology. Liquid fuels are projected to continue to be a necessary component in supplying human energy needs.[2] Technological advances in drilling have driven the shale-gas production boom, leading to an increase in natural gas contribution to the energy demand. Another driving force for the development of highly efficient GTL facilities is the percentage of stranded natural gas that is flared because transportation costs of gaseous fuels are too high to make transporting them economical. In 2011, $5.3 \times 10^{12}$ cubic feet of associated petroleum gas was flared; the equivalent of about 25% of annual gas consumption in the United States.[3] At current market price ($2/MMBtu)[4] for natural gas, the nominal market value of the flared gas was $13.8 billion. GTL is an effective way to monetize the stranded natural gas. However, widespread applications of GTL processes have been hindered due to high risk of cost escalation associated with GTL based projects. The syngas production unit accounts for 30-50% of the total capital cost investment.[5]

The carbon efficiency is defined here as the percentage of carbon in the natural gas feed that is converted to CO and in-turn to liquid fuels. This number increases as the net conversion to $CO_2$ decreases. The carbon efficiency is qualitatively measured by a reduction in the total natural gas consumption over that used in the conventional method of syngas production, which uses an auto-thermal reforming based system. The benefits of this disclosure are demonstrated by considering a case study for a 50,000 bpd GTL plant. The design $H_2$/CO ratio for this GTL plant is 2.19, and it is achieved using a $(H_2—CO_2)/(CO+CO_2)$ ratio of 1.58.

Carbon Capture Utilization and Sequestration (CCUS) is also a grand challenge for modern chemical engineers. Many new technologies strive to implement either $CO_2$ capture or $CO_2$ utilization, but the two processes are rarely thought of as mutually inclusive. In order to have a meaningful impact on the mitigation of $CO_2$ emissions it is paramount that $CO_2$ capture and utilization or sequestration technologies are developed in conjunction with each other.

SUMMARY

This disclosure relates to reactors and methods that may significantly reduce the costs associated with syngas production from natural gas using chemical looping technology and applying a novel concept of reacting the $CO_2$ to near extinction, or consuming more $CO_2$ than is produced. The disclosure includes a reactors and processes that allow for both the capture and the utilization of $CO_2$ in a single process while utilizing fossil fuels. On a commercial scale, a fossil fuel process involving unprecedented simultaneous capture and utilization of $CO_2$ can be transformational and disruptive in conventional $CO_2$ utilization and carbon capture markets.

The methods and system configurations disclosed herein use a chemical looping system characterized by a co-current downward contacting reactive flow of oxygen carriers and carbonaceous flow which are accompanied by $CO_2$ recycle and steam which may be introduced at variable flow rates and positions along the reducer in order to generate the desired quantity and quality of syngas for liquid fuel production. These specific operating conditions, along with a unique oxygen carrier and support composition and heat transfer management, yield a system with highly controlled oxygen transfer that ensures the highly efficient generation of the desired syngas quality.

This disclosure describes specific reactors and conditions that enable the disclosed novel chemical looping process to function as a carbon negative or a carbon neutral fossil fuel process. In cases where the $CO_2$ consumed is more than $CO_2$ produced ($CO_2$ negative system), the disclosed chemical looping system can function as an effective $CO_2$ utilization system.

In one aspect, disclosed herein is a system for converting a fuel, the system comprising: a first moving bed reactor comprising a metal oxide particles having a primary component and a secondary component, wherein fuel, $CO_2$ and steam are added to the first reactor in a co-current flow pattern relative to the metal oxide particles, wherein the first reactor is configured to reduce at least a portion of the metal oxide particles with the fuel to produce a first reduced metal oxide, and is further configured to produce a first syngas stream comprising $H_2$, CO, $CO_2$ and steam; a second moving bed reactor, operating in parallel with the first moving bed reactor and comprising metal oxide particles having a primary component and a secondary component, wherein fuel, $CO_2$ and steam are added to the second reactor in a co-current flow pattern relative to the metal oxide particles, wherein the second reactor is configured to reduce at least a portion of the metal oxide particles with the fuel to produce a second reduced metal oxide, and is further configured to produce a second syngas stream comprising $H_2$, CO, $CO_2$ and steam; a separation unit, in communication with the first reactor and the second reactor, and configured to remove the $CO_2$ from the first syngas stream and the second syngas stream, wherein the $H_2$/CO ratios of the first and second syngas streams are controlled by recycling substantially all of the $CO_2$ from the separation unit to the first reactor and the second reactor; and a third co-current fluidized bed reactor in communication with the first reactor and the second reactor and configured to oxidize the first reduced metal oxide and the second reduced metal oxide with an oxidizing agent to produce oxidized metal oxide particles and recycle the oxidized composite metal oxide to the first reactor and the second reactor for subsequent reduction reactions.

In some embodiments, the primary component is $Fe_2O_3$. In some embodiments, the secondary component comprises a metal-oxide selected from the group consisting of oxides of Ti, Al, Co, Cu, Mg, Mn, Zn, and combinations thereof. In some embodiments, the secondary component is titanium oxide. In some embodiments, the fuel is methane. In some embodiments, the $H_2$/CO ratio of the first syngas stream is about 2.9 to about 3.1. In some embodiments, the $H_2$/CO ratio of the second syngas stream is about 1.0 to about 1.5. In some embodiments, the combination of the syngas from each reducer results in a total syngas $H_2/CO$ ratio of about 1 to about 3. In some embodiments, the first reduced metal oxides and the second reduced metal oxides are oxidized by introducing steam into the third reactor. In some embodiments, the system consumes more $CO_2$ than it produces.

In a second aspect, disclosed herein is a system for converting a fuel, the system comprising: a plurality of moving bed reactors operating in parallel, each comprising a plurality of metal oxide particles having a primary component and a secondary component, wherein the plurality of moving bed reactors are configured to reduce at least a portion of the metal oxide particles with fuel to produce reduced metal or reduced metal oxide particles, and are further configured to produce syngas streams comprising $H_2$, CO, $CO_2$, and steam; a separation unit, in communication with the plurality of moving bed reactors, and configured to remove the $CO_2$ from the syngas streams, wherein the $H_2/CO$ ratios of the first and second syngas streams are controlled by recycling substantially all of the $CO_2$ from the separation unit to the plurality of moving bed reactors; and an oxidation reactor in communication with the plurality of moving bead reactors, and configured to oxidize the reduced metal or metal oxide particles to produce oxidized metals or metal oxide particles and recycle the oxidized metals or metal oxide particles to the plurality of moving bed reactors for subsequent reduction reactions.

In some embodiments, the combination of the syngas streams results in a total syngas $H_2/CO$ ratio of about 1 to about 3.

In another aspect, disclosed herein is a method for converting fuel, the method comprising: feeding the fuel and metal oxide particles into a first moving bed reactor, operating in parallel with a second moving bed reactor, in a co-current flow pattern relative to one another, wherein the metal oxide particles comprise a primary component and a secondary component and reducing at least a portion of the metal oxide particles in the first moving bed reactor to produce a first reduced metal oxide and a first syngas stream comprising $H_2$, CO, $CO_2$ steam or combinations thereof; feeding the fuel and metal oxide particles into a second moving bed reactor in a co-current flow pattern relative to one another, and reducing at least a portion of the metal oxide particles in the second moving bed reactor to produce a second reduced metal oxide and a first syngas stream comprising $H_2$, CO, $CO_2$ steam or combinations thereof; transporting the first reduced metal oxide particles and the second reduced metal oxide particles to a third reactor to oxidize the first reduced metal oxide particles and the second reduced metal oxide particles to produce oxidized metal oxide particles and recycling the oxidized metal oxide particles to the first and second reactors for subsequent reduction reactions; and removing the $CO_2$ from the first and second syngas streams in a separation unit and controlling the $H_2/CO$ ratio by recycling substantially all of the $CO_2$ from separation unit to the first moving bed reactor and second moving bed reactor, wherein the combination of the first and second syngas streams result in a total syngas $H_2/CO$ of about 2.

In some embodiments, $CO_2$ and steam are fed into the first moving bed reactor and the second moving bed reactor. In some embodiments, the first and second moving bed reactors operate at a temperature of about 800° C. to about 1190° C. In some embodiments, the first and second moving bed reactors operate at a pressure of about 1 atm to about 10 atm. In some embodiments, the fuel is methane. In some embodiments, the primary component is $Fe_2O_3$. In some embodiments, the first and second moving bed reactors have an effective $Fe_2O_3/CH_4$ ratio of about 0.5 to about 1. In some embodiments, the first reduced metal oxides and the second reduced metal oxides are oxidized by introducing steam into the third reactor.

Other aspects of the invention will become apparent by consideration of the detailed description and accompanying drawings.

DETAILED DESCRIPTION

Figure 1:
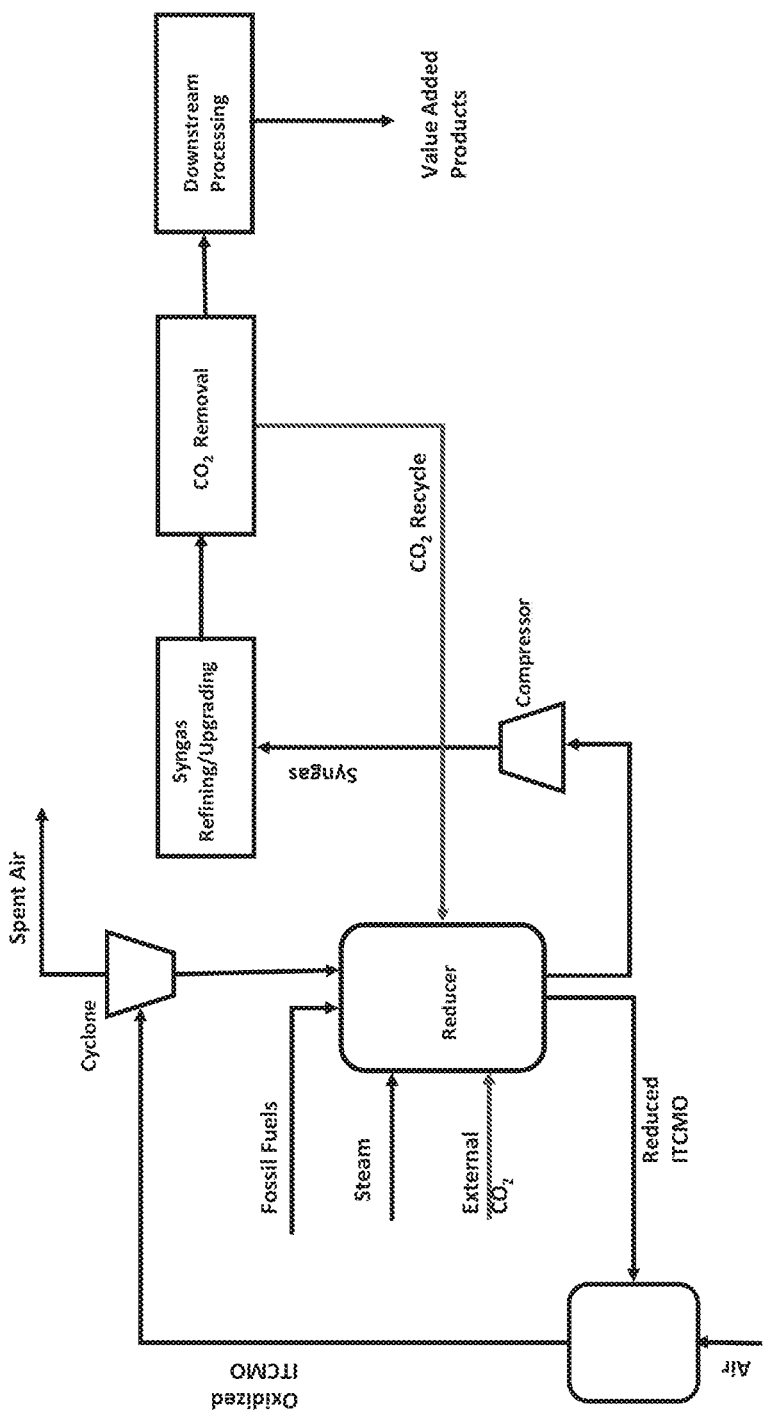
FIG. 1: Conceptual schematic for a carbon negative or carbon neutral iron based chemical looping system that uses $CO_2$ recycle and an external $CO_2$ source in the high efficiency conversion of fossil fuels.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

This disclosure describes specific reactors and conditions that allow the disclosed novel chemical looping process to function as a carbon negative or a carbon neutral fossil fuel process. In cases where the $CO_2$ consumed is more than $CO_2$ produced ($CO_2$ negative system), the disclosed chemical looping system can function as an effective $CO_2$ utilization system.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of" the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

"Carbon neutral," as used herein, refers to a system or process in which about 100% of the $CO_2$ produced by a system is recycled.

"Carbon negative," as used herein, refers to a system or process in which more $CO_2$ is consumed than the system or process produces.

2. Syngas Production Systems

To maximize the amount of syngas produced per mole of a fossil fuel feedstock, a novel modularization strategy can be employed in which multiple reducer reactors operate in parallel. This concept allows for each reducer reactor to operate under different operating conditions and produce different qualities of syngas. The operating conditions yield the desired overall syngas purity and $H_2:CO$ requirements when linearly combined while using less fossil fuel feedstock when compared to a single reducer reactor.

FIG. 1 shows a scheme for a carbon negative chemical looping process that converts fossil fuels to value added products. The process comprises co-feeding fossil fuels, $CO_2$ and steam into multiple moving bed reducer reactors to produce syngas. The fossil fuels may include but are not limited to gaseous fossil fuels (natural gas, shale gas, coal bed methane, etc.), solid fossil fuels (coal, biomass, petcoke, etc.), or liquid fossil fuels (kerosene, petroleum, etc.).

Operating conditions for a syngas producing reducer reactor are chosen to maximize the moles of syngas produced per mole fossil fuel feedstock, to maximize syngas purity, and to meet the $H_2:CO$ ratio requirements for downstream processes. A novel combination of these conditions can yield a $CO_2$ negative scheme, in which the molar amount of $CO_2$ entering the reactor divided by the molar amount of $CO_2$ exiting the reactor (CRP or $CO_2$ reaction parameter) is greater than 1.

A specific set of operating conditions is given in Table 1 (below). Group (1) refers to the reaction of $CH_4$ with the metal oxide; Group (2) refers to the reactions of $CH_4$ with $CO_2$ and the metal oxide; Group (3) refers to the reactions of $CH_4$ with $H_2O$ and the metal oxide; Group (4) refers to the reactions of $CH_4$ with $CO_2$, $H_2O$ and the metal oxide. For a Group (4) operation, it can be seen that a CRP>1 operating condition that reasonably satisfies the previously given criteria has been determined thermodynamically and verified with experiments.

TABLE 1

Experimental data for various reaction conditions involving $CH_4$,
$Fe_2O_3$ and/or $CO_2$ and/or $H_2O$ in a single co-current moving bed reactor

|  | Group (1) | | Group (2) | | Group (3) | | Group (4) | |
|---|---|---|---|---|---|---|---|---|
| Input Conditions | | | | | | | | |
| $CH_4$ flow rate (SLPM) | 1.0 | 1.3 | 1.1 | 1.1 | 0.9 | 0.9 | 0.9 | 0.7 |
| $H_2O$ flow rate (mL/min) | 0 | 0 | 0 | 0 | 0.15 | 0.2 | 0.2 | 0.15 |
| $H_2O/CH_4$ molar ratio | 0 | 0 | 0 | 0 | 0.61 | 0.79 | 0.79 | 0.78 |
| $CO_2$ flow rate (SLPM) | 0 | 0 | 0.22 | 0.33 | 0 | 0 | 0.14 | 0.11 |
| $CO_2/CH_4$ molar ratio | 0 | 0 | 0.2 | 0.3 | 0 | 0 | 0.15 | 0.15 |
| $Fe_2O_3$:$CH_4$ molar ratio | 1.03 | 0.75 | 0.83 | 0.77 | 0.68 | 0.68 | 0.65 | 0.81 |
| Reactor temperature (° C.) | 1037 | 1039 | 1039 | 1038 | 1032 | 1031 | 1037 | 1034 |
| Experimental results | | | | | | | | |
| % $CH_4$ conversion | 95.7 | 93.3 | 94.5 | 94.1 | 93.3 | 96.5 | 94.3 | 93.2 |
| $H_2$:CO molar ratio | 1.83 | 1.84 | 1.53 | 1.41 | 2.14 | 2.15 | 1.95 | 1.90 |
| $CO/CO_2$ molar ratio | 8.11 | 9.52 | 13.5 | 13.7 | 13.1 | 12.9 | 13.6 | 13.7 |
| CRP | 0 | 0 | 1.93 | 2.50 | 0 | 0 | 1.51 | 1.66 |
| % Syngas Purity on dry basis | 94.2 | 93.9 | 95.2 | 95.1 | 95.3 | 96.4 | 95.8 | 95.4 |
| Thermodynamic results | | | | | | | | |
| % $CH_4$ conversion | 100 | 100 | 100 | 100 | 100 | 100 | 100 | 100 |
| $H_2$:CO molar ratio | 1.88 | 1.88 | 1.57 | 1.45 | 2.46 | 2.61 | 2.23 | 2.18 |
| $CO/CO_2$ molar ratio | 12.8 | 12.8 | 12.8 | 12.9 | 12.9 | 11.3 | 9.09 | 6.89 |
| CRP | 0 | 0 | 2.31 | 3.20 | 0 | 0 | 1.32 | 1.03 |
| % Syngas Purity on dry basis | 97.4 | 97.4 | 97.1 | 96.9 | 97.8 | 97.6 | 96.7 | 95.6 |

Figure 2A:
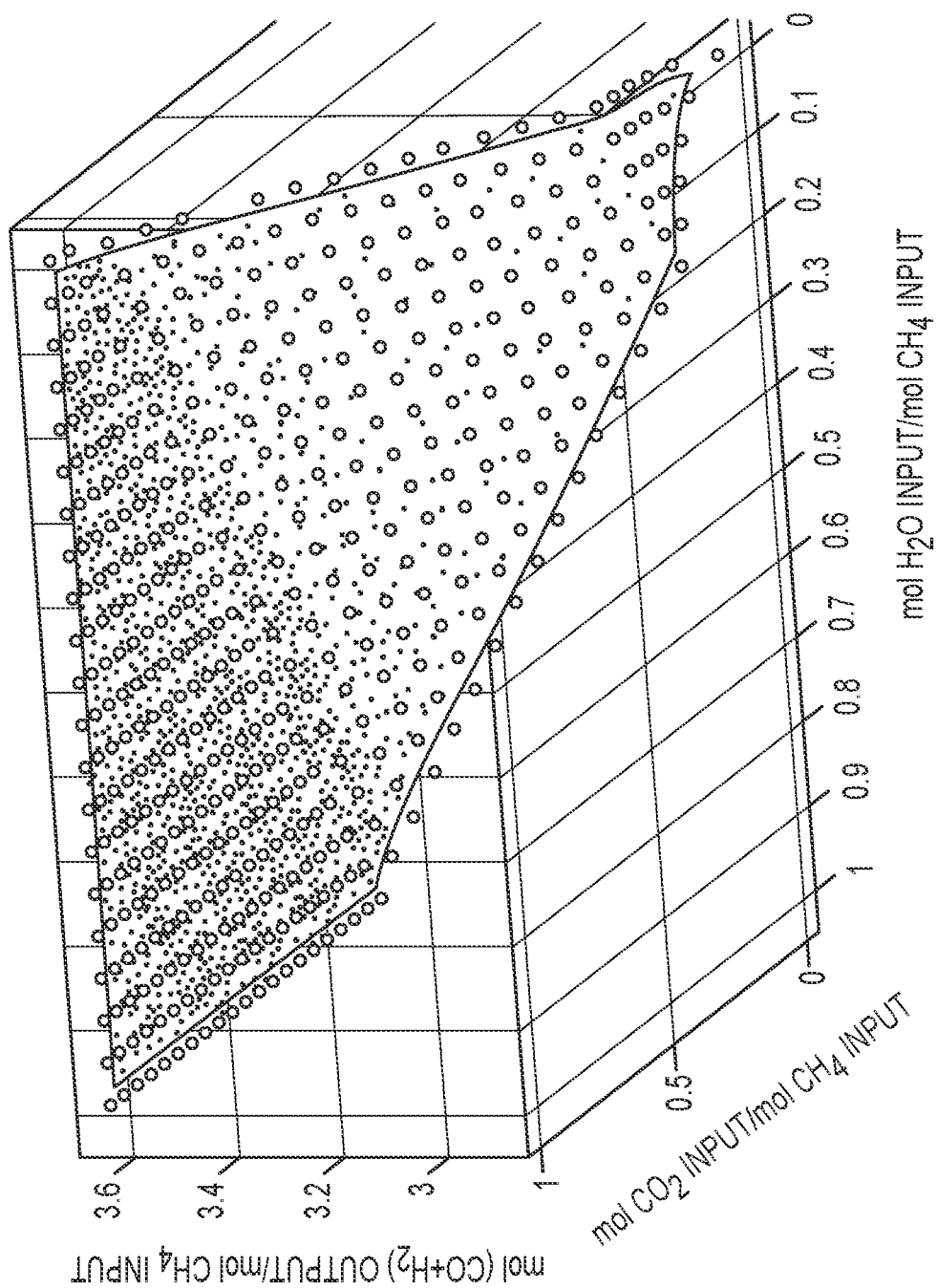
FIG. 2a: Syngas generation surface for iron-titanium composite metal oxide (ITCMO) at an $Fe_2O_3:CH_4$ ratio of 0.33.
Figure 2B:
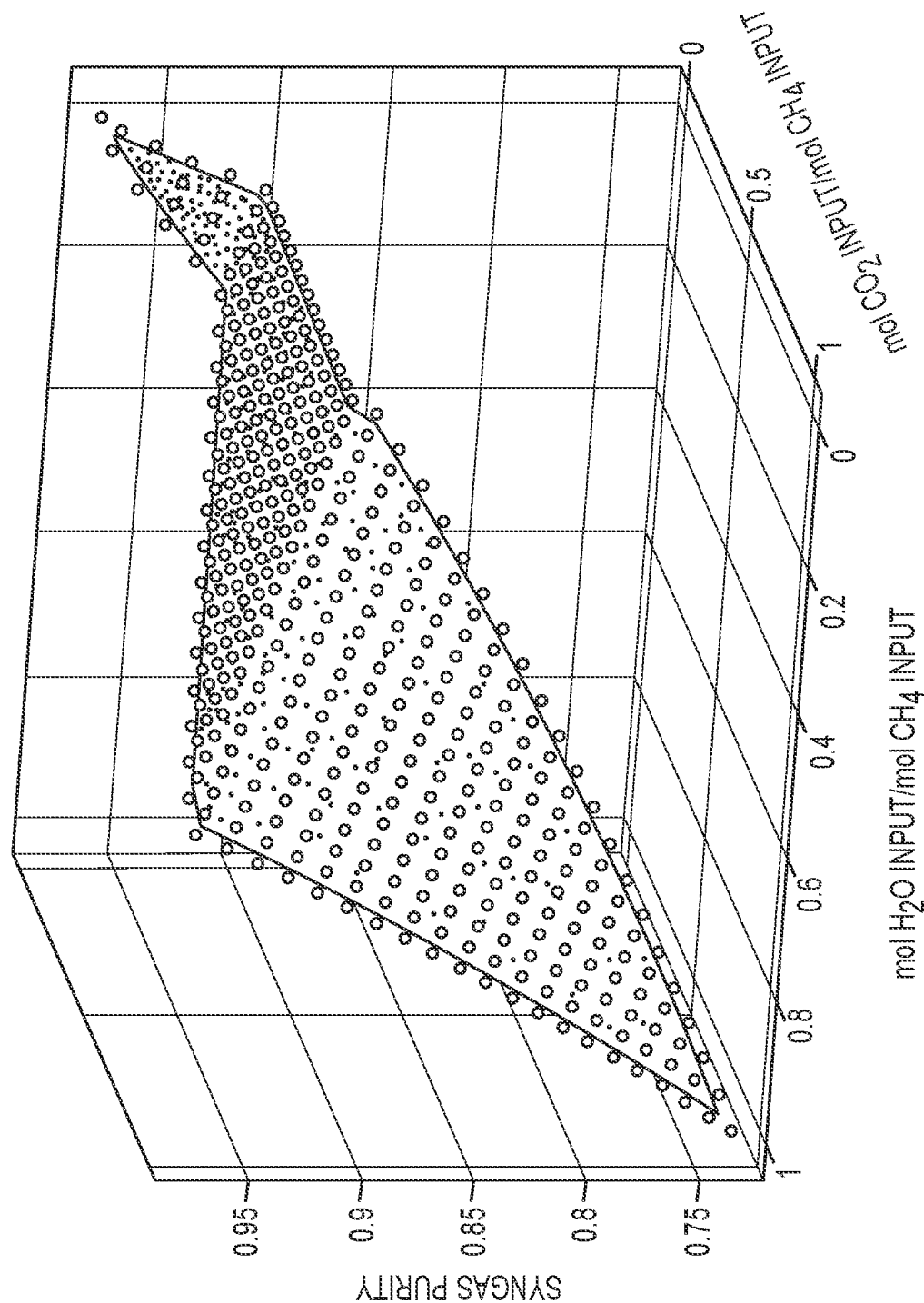
FIG. 2b: Syngas purity surface for ITCMO at an $Fe_2O_3:CH_4$ ratio of 0.333.

In certain embodiments of the carbon negative chemical looping system, the conditions necessary for a CRP greater than 1 are fixed using thermodynamic Gibbs free energy minimization simulations. FIG. 2a depicts syngas production per mole $CH_4$ feedstock as a function of $CO_2$ and $H_2O$ input to the reactor. It is noted that the largest amount of syngas is produced per mole $CH_4$ at high $H_2O$ and $CO_2$ inputs. FIG. 2b, however, shows that the syngas purity (moles ($H_2$+CO)/(total moles syngas)) is relatively low (75%) under these operating conditions due to a fraction of the $H_2O$ and $CO_2$ feedstocks flowing through the reactor unreacted. Typically, a high syngas purity (greater than 95%) is desirable for efficient downstream processing.

Figure 3:
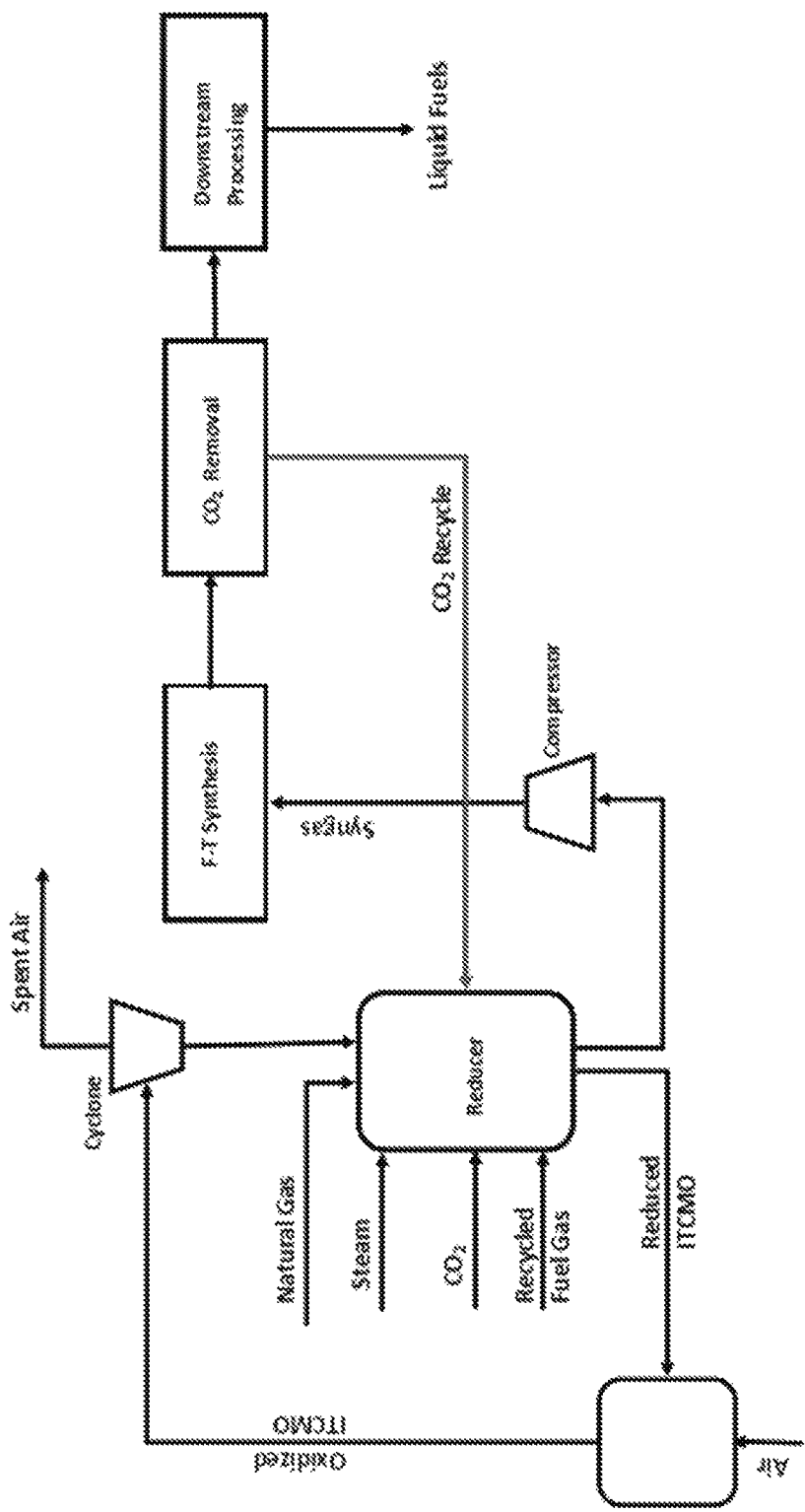
FIG. 3: Conceptual schematic for a carbon negative or carbon neutral iron based chemical looping system that uses $CO_2$ recycle and an external $CO_2$ source in the high efficiency conversion of natural gas to syngas suitable for Fischer-Tropsch synthesis and the production of liquid fuels.

FIG. 3 shows one embodiment of the design of the carbon negative chemical looping system. In this embodiment, natural gas is converted to syngas which is suitable for Fischer-Tropsch synthesis and the production of liquid fuels.

Figure 4:
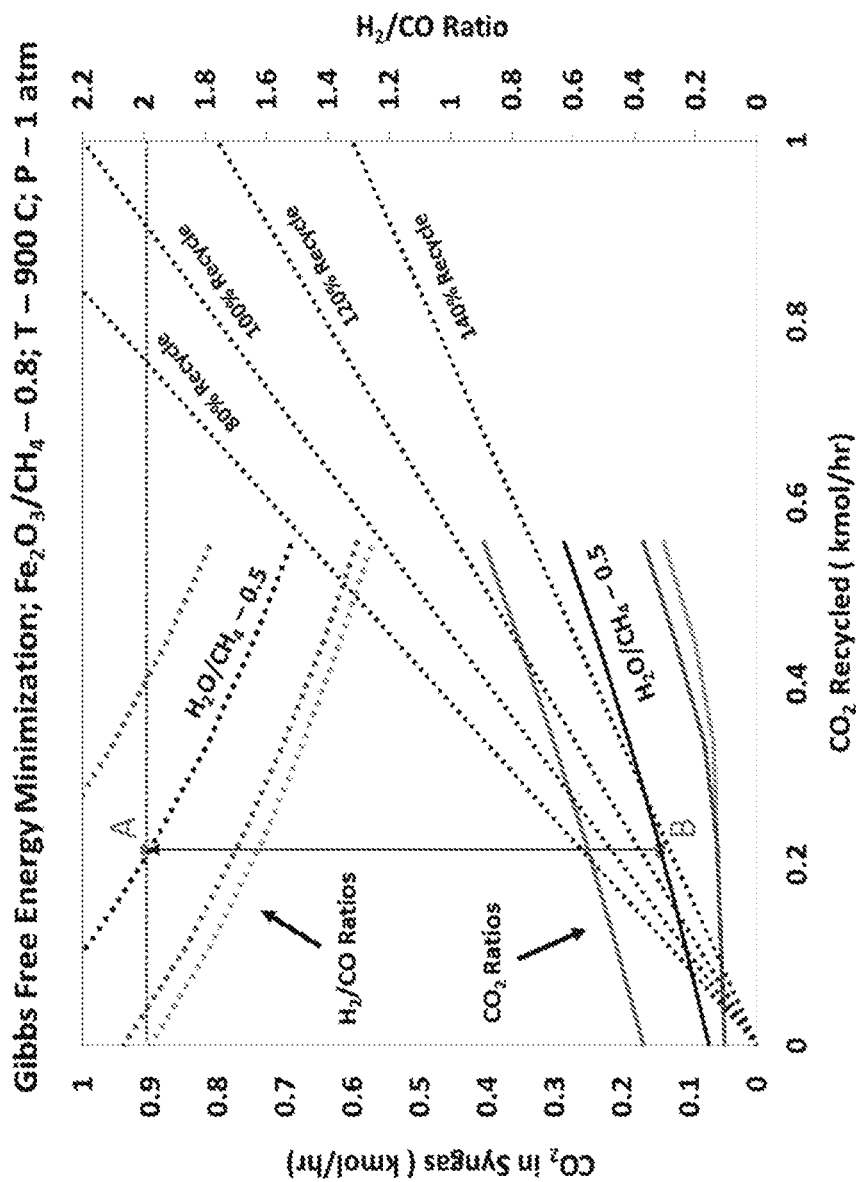
FIG. 4: Comparison of obtainable $H_2/CO$ ratios with corresponding percentages of $CO_2$ recycle at various $H_2O/CH_4$ ratios.

FIG. 4 shows an analysis of the viable operating points for the carbon negative system shown in FIG. 3. The graph includes $H_2$/CO ratios and corresponding ratios for the amount of $CO_2$ in syngas to the amount of $CO_2$ being recycled at various steam to natural gas ratios. From this graph it is possible to determine if a set of conditions yield a syngas stream at the correct $H_2$/CO ratio and what $CO_2$ recycle percentage this point corresponds to. One example is shown by the connection of points A and B. This example corresponds to a $H_2O/CH_4$ ratio of 0.5, a $H_2$/CO ratio of 2.0, and a $CO_2$ recycle rate of nearly 140%.

Figure 5:
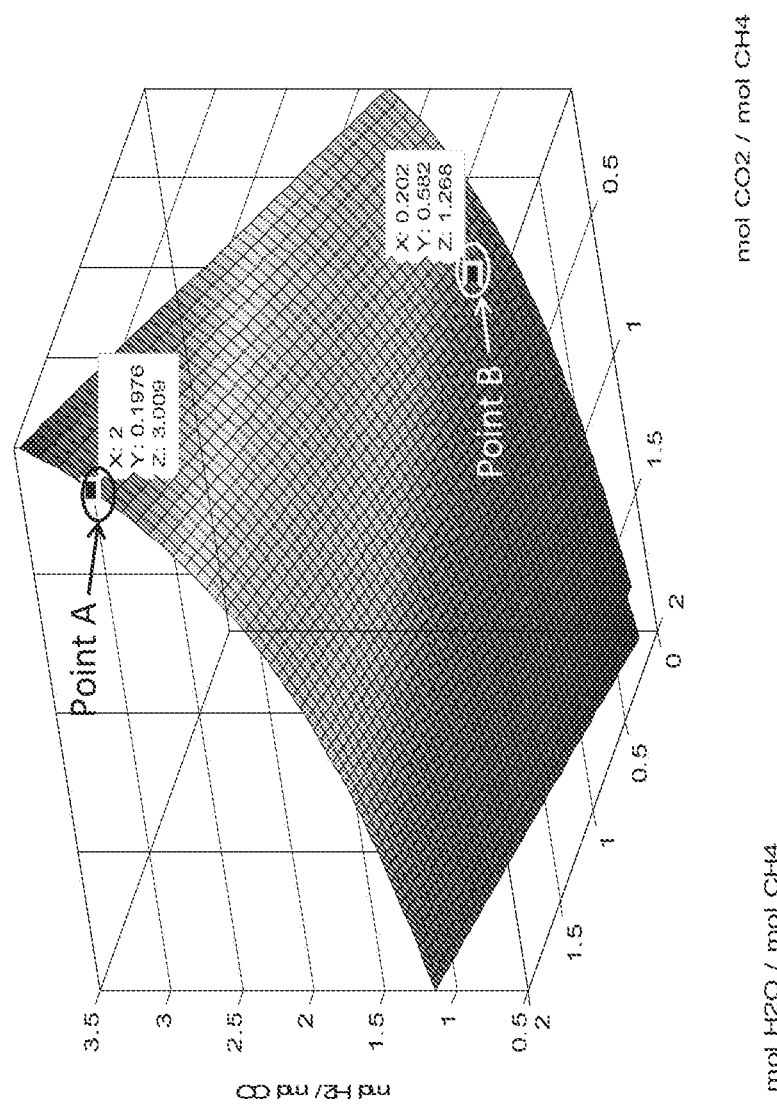
FIG. 5: $H_2/CO$ ratio as a function of $H_2O/CH_4$ and $CO_2/CH_4$ ratios, at 900° C., 1 atm, for a co-current moving bed reactor and at an effective $Fe_2O_3/CH_4$ ratio of 0.8.

FIG. 5 shows $H_2$/CO ratio as a function of steam input and $CO_2$ per mol of $CH_4$ for a co-current moving bed reactor, operating at 900° C., 1 atm and effective $Fe_2O_3/CH_4$ ratio of 0.8.

Figure 6:
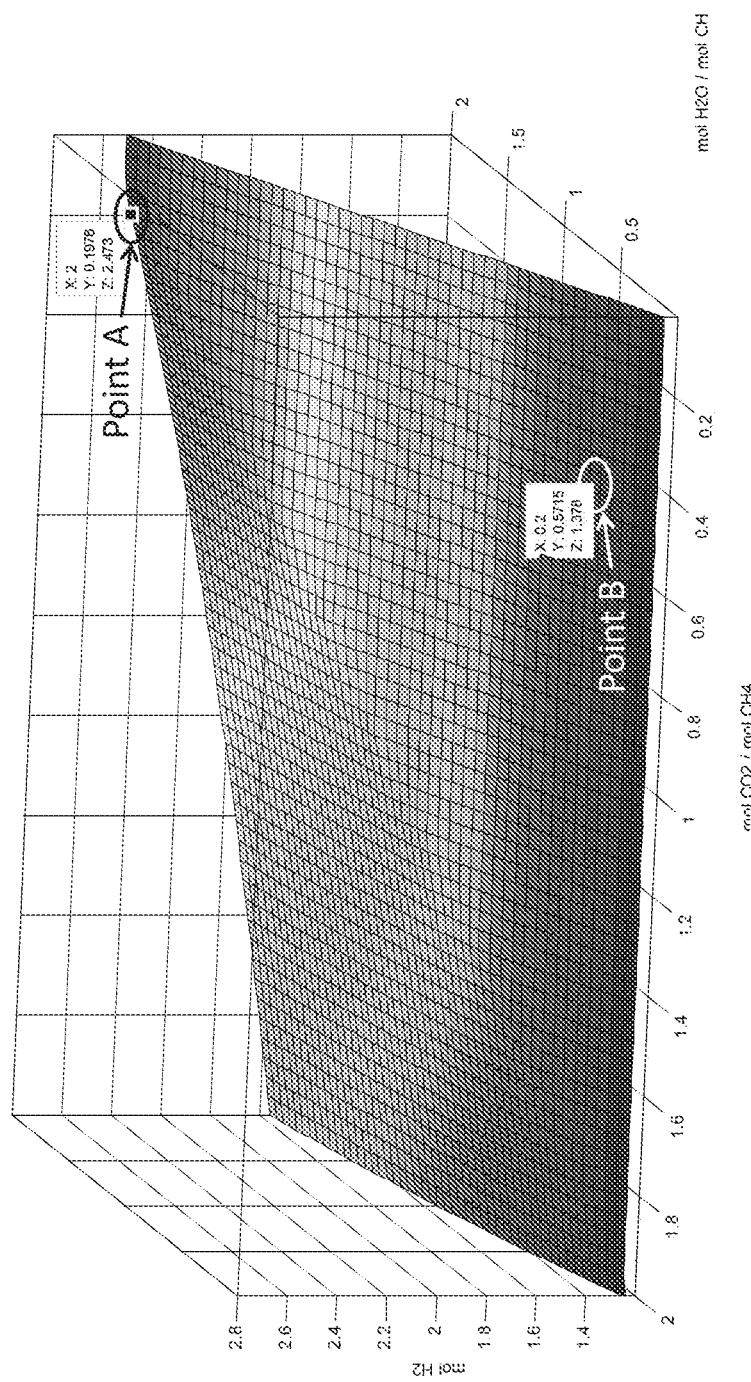
FIG. 6: $H_2$ flowrate as a function of $H_2O/CH_4$ and $CO_2/CH_4$ ratios, at 900° C., 1 atm, for a co-current moving bed reactor and at an effective $Fe_2O_3/CH_4$ ratio of 0.8.
Figure 7:
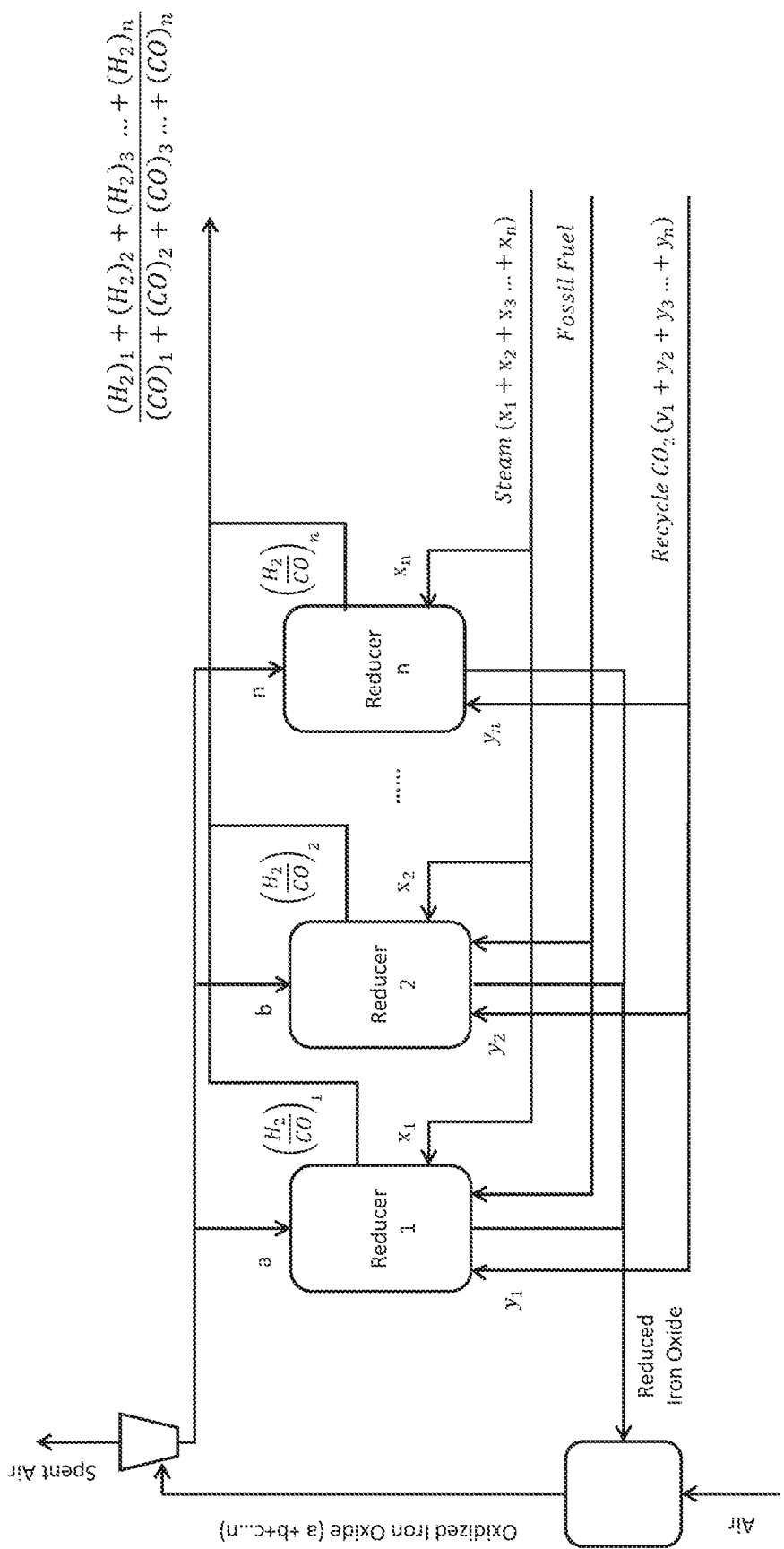
FIG. 7: Conceptual schematic of multiple reducers operating in parallel with a single combustor reactor.
Figure 8:
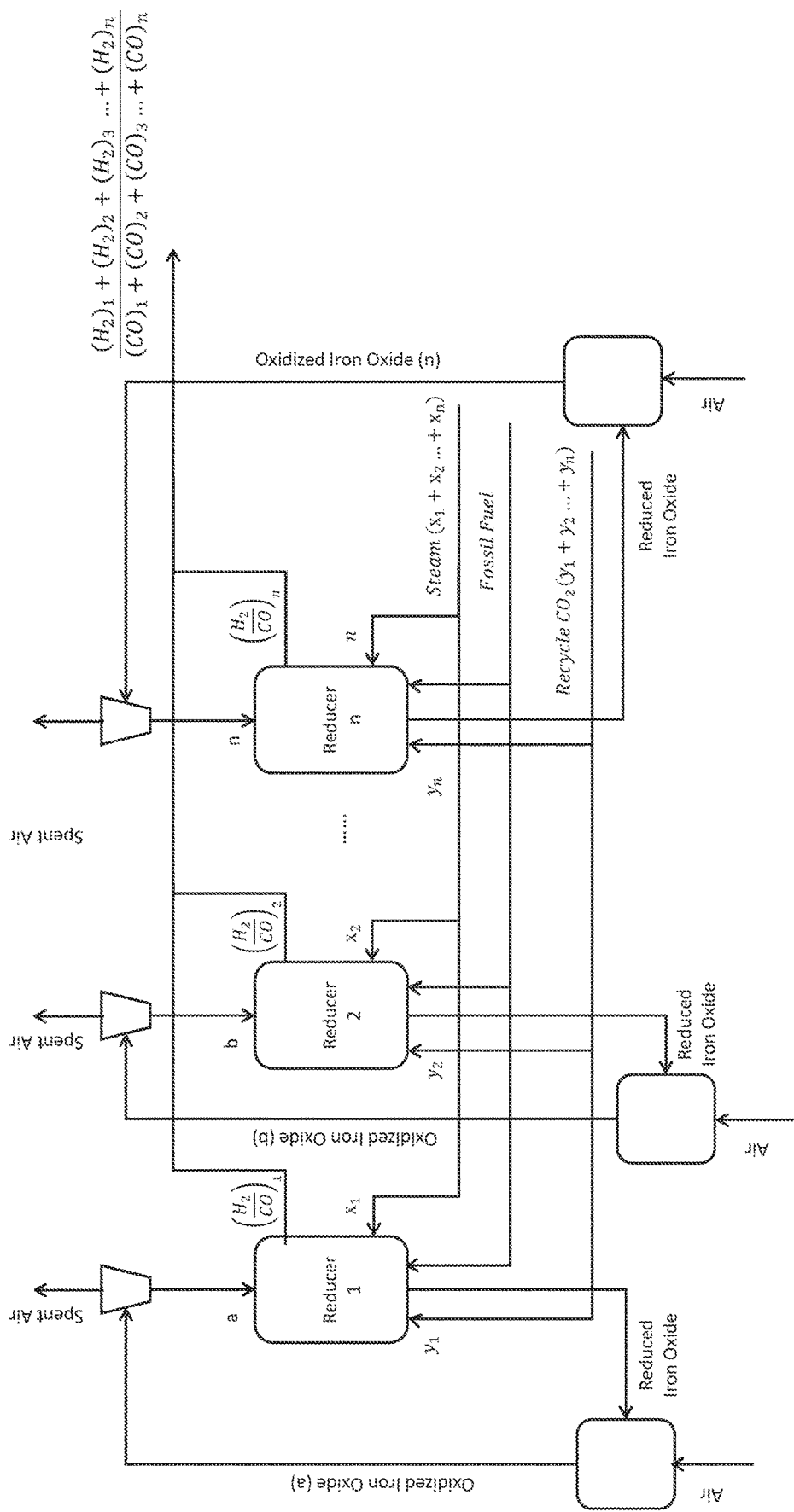
FIG. 8: Conceptual schematic of multiple reactor modules, containing multiple reducers and combustors.

FIG. 6 shows the variation of $H_2$ flowrate, in syngas, for the $H_2$/CO ratio shown in FIG. 4. It should be noticed that the nonlinearity between the $H_2$/CO ratio when steam and $CO_2$ is variably input is an unique characteristic of $CO_2$ recycle in chemical looping systems. This nonlinearity may be leveraged to develop a multiple reducer system. Each of these reducer reactors may be exclusively optimized to maximize the overall benefits in terms of carbon efficiency and cost, obtained from minimizing the overall natural gas consumption. A multiple reducer system can be feasibly conceived on a commercial scale as a single circulating solids loop with multiple reducers and a single combustor, as shown in FIG. 7. Another commercial scale operation of the multiple reducer system can be designed with multiple modules, each containing multiple reducers and combustors, as shown in FIG. 8.

Figure 9:
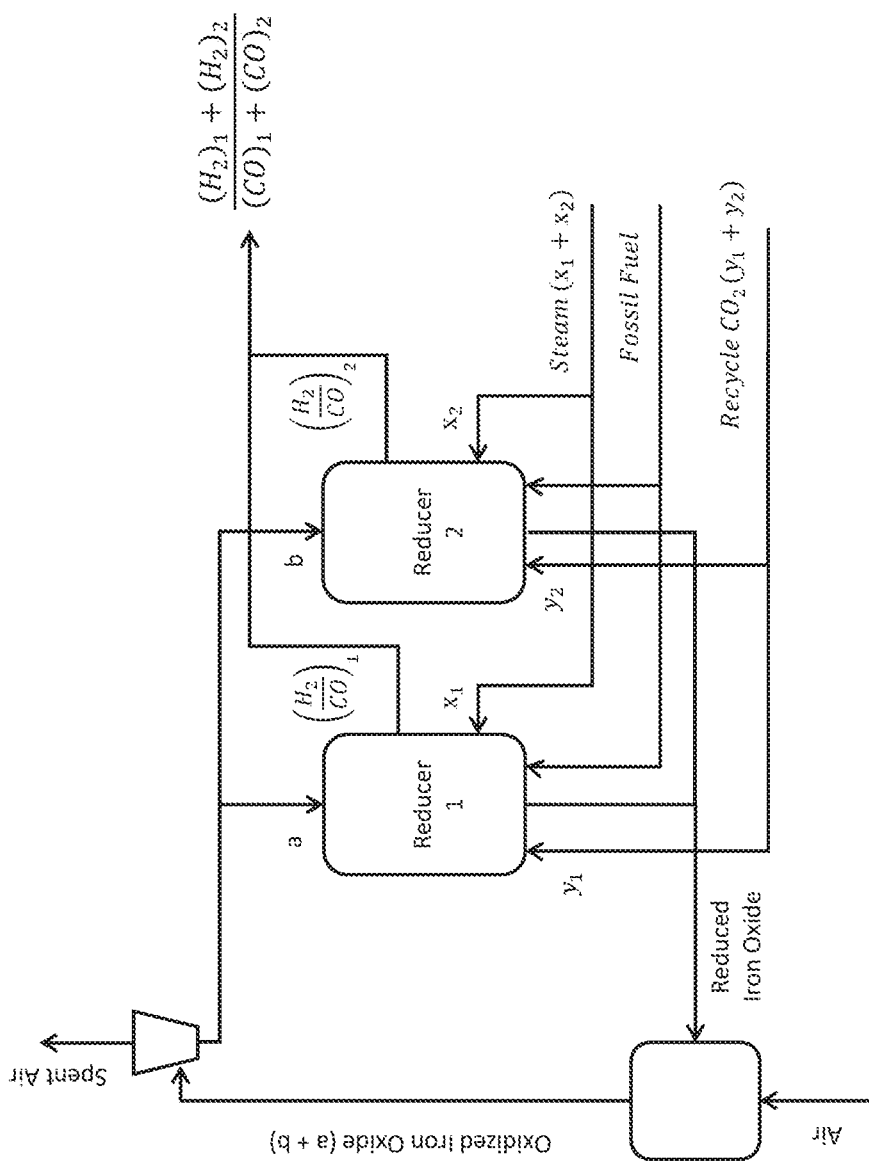
FIG. 9: Conceptual schematic of chemical looping $CO_2$ recycle concept with two reducers operating in parallel with a single combustor reactor.
Figure 10:
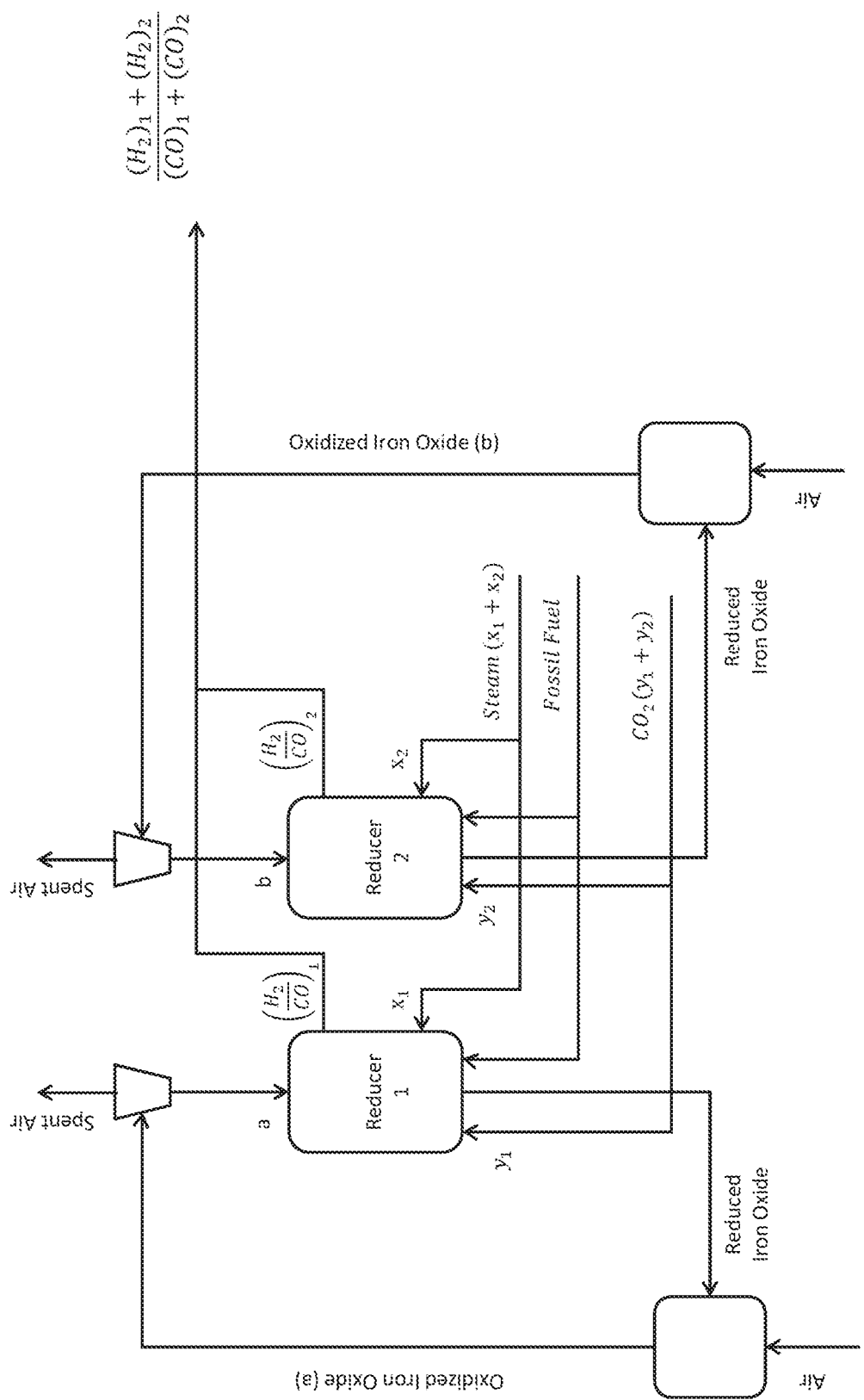
FIG. 10: Conceptual schematic of chemical looping $CO_2$ recycle concept with two modules, containing both a reducer and combustor, operating in parallel.
Figure 11:
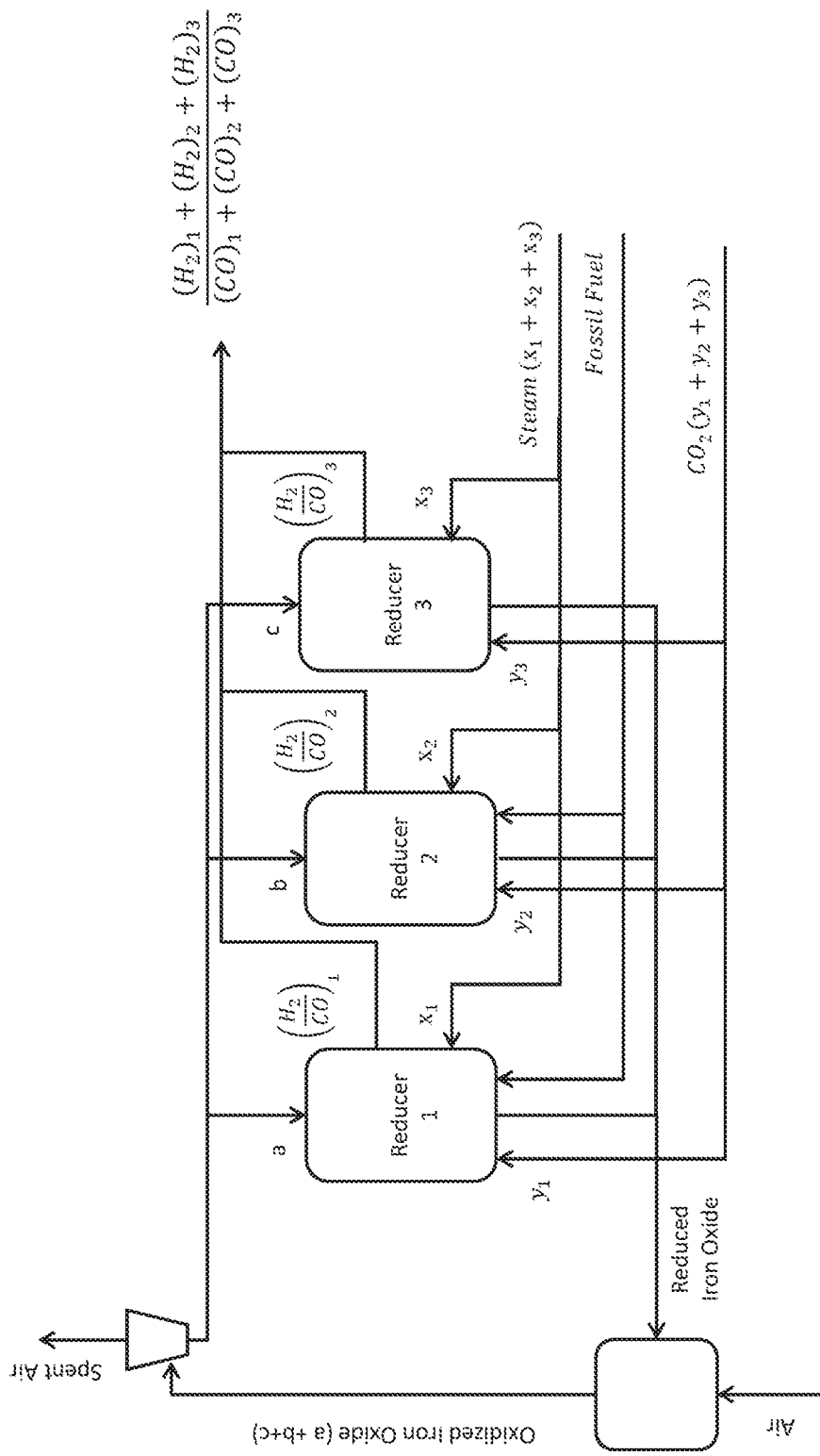
FIG. 11: Conceptual schematic of chemical looping $CO_2$ recycle concept with three reducers operating in parallel with a single combustor reactor.
Figure 12:
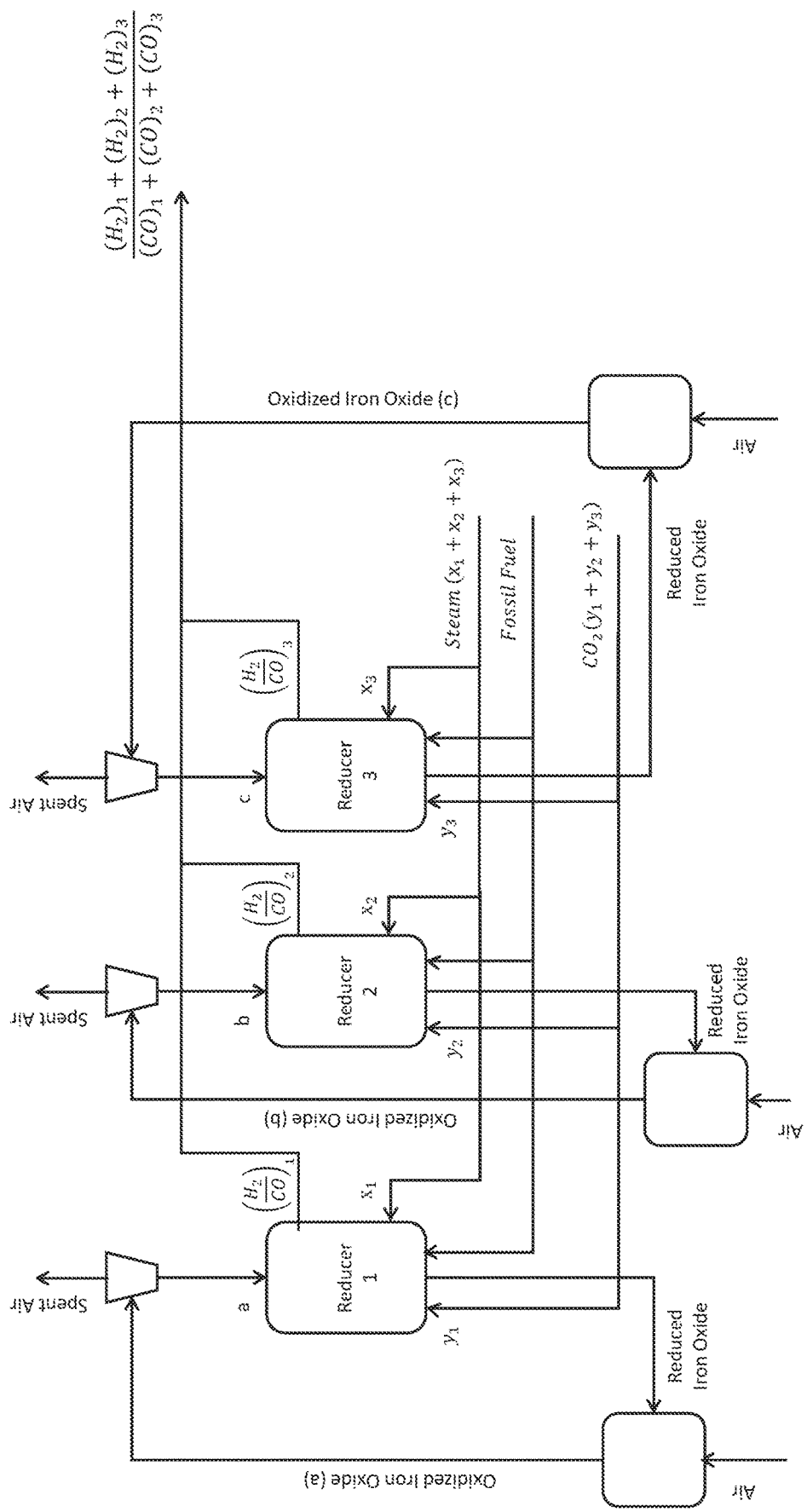
FIG. 12: Conceptual schematic of chemical looping $CO_2$ recycle concept with three modules, containing both a reducer and combustor, operating in parallel.
Figure 13:
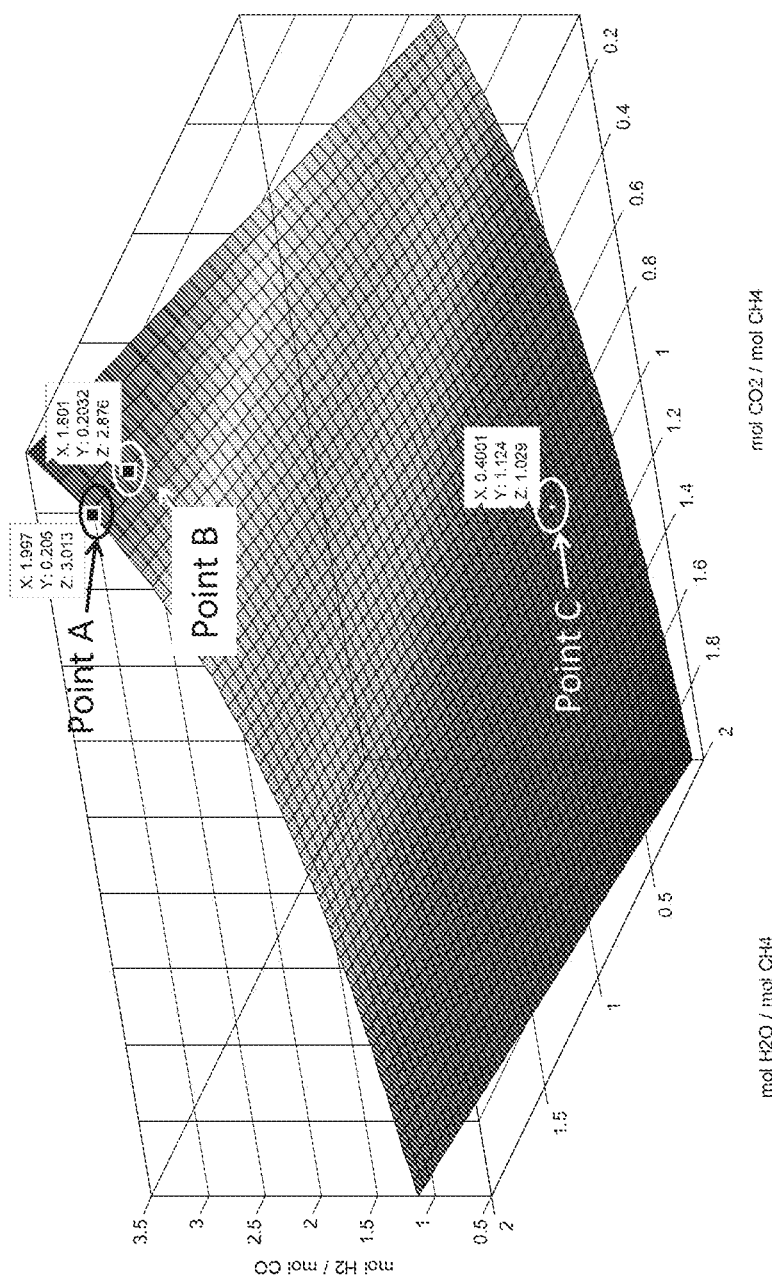
FIG. 13: $H_2/CO$ ratio as a function of $H_2O/CH_4$ and $CO_2/CH_4$ ratios, at 900° C., 1 atm, for a co-current moving bed reactor and at an effective $Fe_2O_3/CH_4$ ratio of 0.8.
Figure 14:
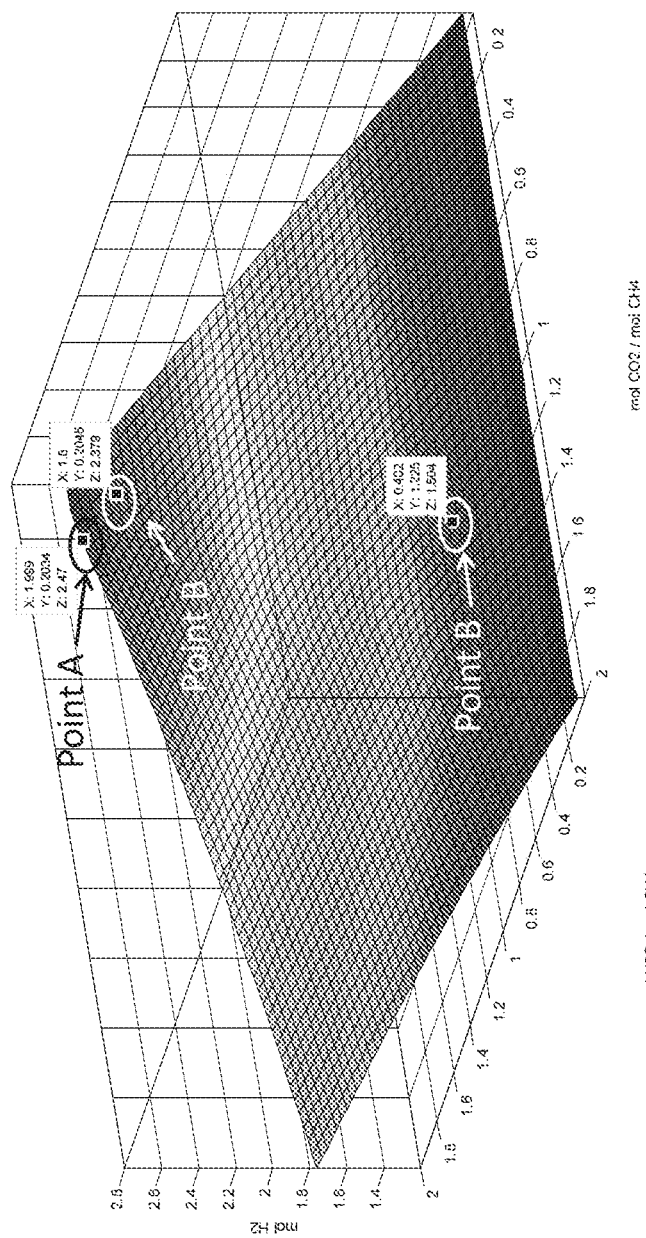
FIG. 14: $H_2$ flowrate as a function of $H_2O/CH_4$ and $CO_2/CH_4$ ratios, at 900° C., 1 atm, for a co-current moving bed reactor and at an effective $Fe_2O_3/CH_4$ ratio of 0.8.

In certain embodiments, the chemical looping recycle system comprises a multiple reducer design having a two reducer and a three reducer system, which may generate a syngas composition ($H_2$/CO ratio of 2) needed for Fischer-Tropsch synthesis. FIG. 9 and FIG. 10 show a two reducer $CO_2$ recycle chemical looping system, where operating conditions for each reducer are represented by Point A and Point B in FIG. 5 and FIG. 6. Each reducer operation, is optimized such that the net syngas has an effective $H_2$/CO ratio of about 1 to about 3. In certain embodiments, the net syngas has an effective $H_2$/CO ratio of about 2. In certain embodiments, the reducer operation corresponding to Point A, maximizes the $H_2$ production, operating at a $H_2O/CH_4$ ratio of 2, $CO_2/CH_4$ ratio of 0.20, yielding a syngas $H_2$/CO ratio of about 2.9 to about 3.1, preferably 3.02. The reducer corresponding to Point B, optimized for CO production, operates at a $H_2O/CH_4$ ratio of 0.20, $CO_2/CH_4$ ratio of 0.57, yielding a syngas ratio of about 1.0 to about 1.5, preferably 1.27. The combination of the syngas from each reducer results in a total syngas $H_2$/CO ratio of '2.' Another application of multiple reducer concepts is demonstrated using three reducer modules, as shown in FIG. 11 and FIG. 12 with the specific operating conditions represented by Points A, B, and C in FIGS. 13 and 14. FIGS. 13 and 14 show the $H_2$/CO ratios and $H_2$ flowrates similar to those shown in FIGS. 5 and 6. A three reducer combination could be useful for operating one reducer optimized at an extreme to produce $H_2$ (Point A in FIG. 13), a second reducer optimized at an extreme to produce CO (Point C in FIG. 13), and a third reducer to mitigate the $H_2$/CO ratio (Point B in FIG. 13). The first reducer could operate at Point A ($H_2O/CH_4$ ratio of 2, $CO_2/CH_4$ ratio of 0.20, outputting a $H_2$/CO ratio of 3.0), the second reducer could operate at Point B ($H_2O/CH_4$ ratio of 1.8, $CO_2/CH_4$ ratio of 0.20, outputting a $H_2/CO$ ratio of 2.90), and the third reducer could operate at Point C ($H_2O/CH_4$ ratio of 0.4, $CO_2/CH_4$ ratio of 1.12, outputting a $H_2/CO$ ratio of 1.03). The net $H_2/CO$ ratio of these three reducers is '2.' It should be noted that like the two and three reducer cases, the concept can be expanded to 'n' reducers or modules. Each of these 'n' reducer reactors may be selectively optimized for specific functions, which may include, but are not limited to, operating temperatures, operating pressures, syngas $H_2/CO$ ratios, effective $Fe_2O_3/CH_4$ ratios, support weight percentages, etc. Such specialized operation may be used to reduce overall cost and maximize the efficiency, based on a given set of operating conditions.

Figure 15:
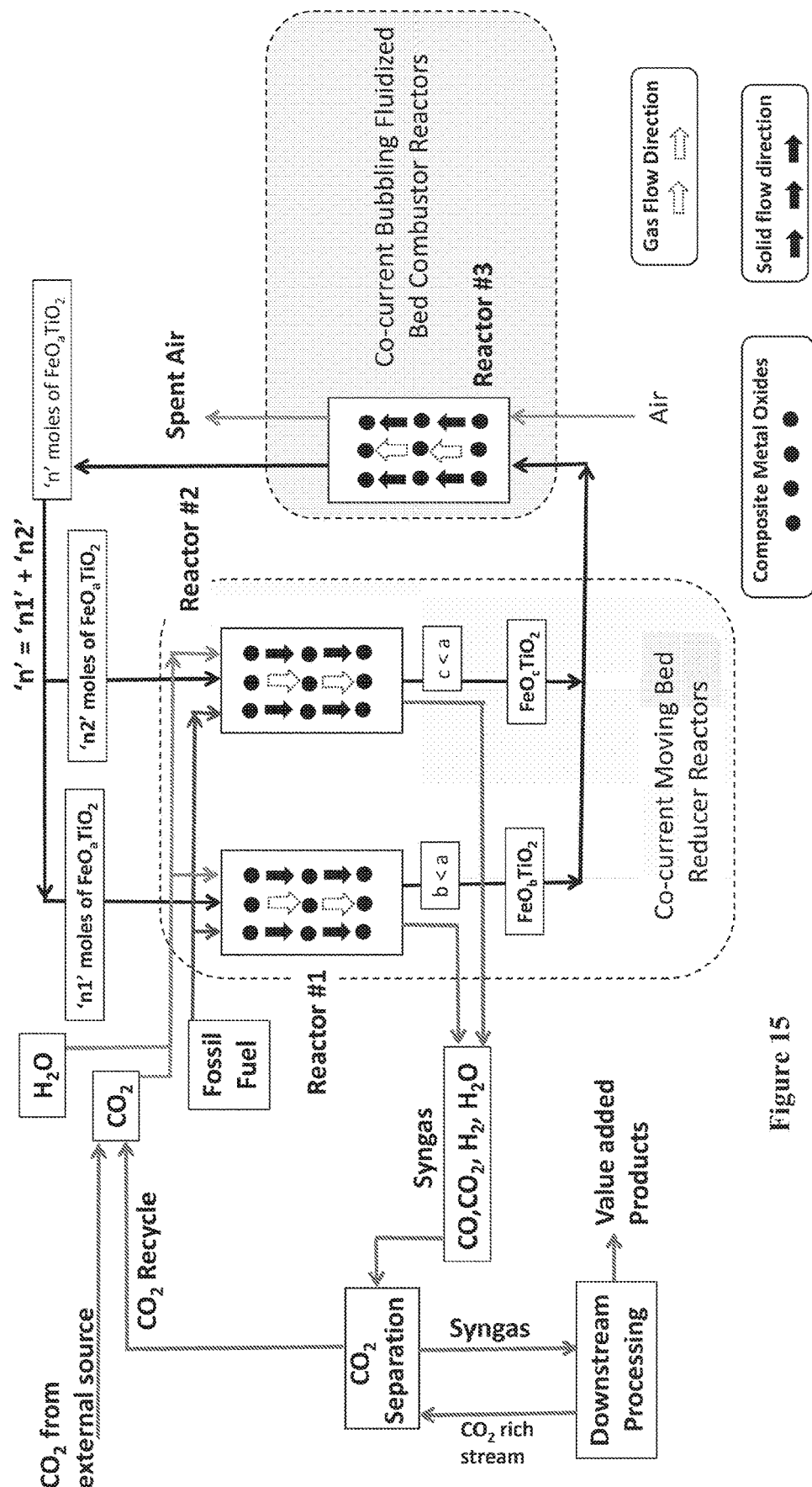
FIG. 15: Schematic representation of an embodiment of the chemical looping $CO_2$ recycle system with two reducers operating in parallel with a single combustor reactor and a $CO_2$ separation unit.

FIG. 15 schematically illustrates a chemical looping modular process for producing syngas from fossil fuel. The systems comprises three main reactor sections including the reducer reactor section, a combustor reactor and a separation unit. The reducer reactor section is a modular system in which two or more co-current moving bed reactors convert fossil fuel to a syngas stream comprising $H_2$, CO, $CO_2$ and steam. The modular configuration of the reducer reactors allows for maximizing the $H_2$+CO production, beyond the configuration of a single reducer reactor. Each reactor in the modular system can be optimized based on the oxygen carrier to fuel ratio, temperature, and pressure of the reactor. One advantage of the co-current moving bed reactors is that it ensures that thermodynamic design conditions for a high syngas conversion can be obtained by controlling the reaction stoichiometric and that sufficient residence times are available for complete reactant conversion.

In certain embodiments of the system, the reducer reactor section comprises two co-current moving bed reactors, operating in parallel. In another embodiment, the reducer reactor system comprises two or more co-current moving bed reactors, operating in parallel with respect to one another. The reducer reactors comprise metal oxide particles. The metal-oxide composition consists of two components, namely primary and secondary. In certain embodiments, the primary metal-oxide is being chosen to be $Fe_2O_3$. The primary metal-oxide should be able to donate oxygen to the fuel mixture. The secondary metal-oxide can be an oxide of any combination of Ti, Al, Co, Cu, Mg, Mn, Zn, etc. The secondary metal-oxide serves to strengthen the primary metal-oxide and can enhance reactivity by forming complexes which have a better thermodynamic selectivity than iron-oxide alone. The oxygen-carrier metal-oxide may contain a combination of primary and secondary metal-oxides in varying weight percentages. The metal-oxide can be prepared by methods including but not limited to extrusion, pelletizing, co-precipitation, wet-impregnation, and mechanical compression. Techniques like sintering the synthesized metal-oxide or adding a binder with sol-gel combustion can be used to increase the strength of the metal-oxide.

In certain embodiments, the specific metal-oxide composition consists of an iron-titanium composite metal oxide (ITCMO) or an iron-aluminum complex. This complex can be titanium-rich, or iron-rich depending on the relative molar ratios. The overall reduced form for the specific chemistry simulated is dependent on the relative molar ratio composition of the metal-oxide. For example, a titanium-rich iron based composite metal-oxide particle contains a $TiO_2:Fe_2O_3$ molar ratio of greater than 2 will yield a reduced form, $FeTiO3$. On the other hand, a $TiO_2:Fe_2O_3$ molar ratio of less than 2 will favor formation of $FeO$—$Fe_2TiO_4$ in addition to $FeTiO_3$ in the composite's reduced form, and the chemistry must be adjusted accordingly.

The usage of ITCMO eliminates the need for molecular $O_2$, lowers operating temperatures, and allows greater flexibility in steam usage, $CO_2$ usage and the $H_2$:CO molar ratio in syngas production. ITCMO particles are designed around lattice oxygen based on higher syngas selectivity and theoretically achieve much greater syngas yield over a wider operational range than molecular $O_2$ or $Fe_2O_3$ alone due to interactions between iron and titanium oxides. The oxygen necessary to convert $CH_4$ to $H_2$ and CO comes from a combination of $H_2O$, $CO_2$ and ITCMO.

In certain embodiments, a combination of fuel, $CO_2$ and steam are added to a first moving bed reactor in a co-current flow pattern relative to the metal oxide particles. The first reactor reduces at least a portion of its the metal oxide particles and oxidizes the fuel to produce a first syngas stream comprising $H_2$, CO, $CO_2$ and steam. Similarly, a combination of fuel, $CO_2$ and steam are added to a second moving bed reactor, operating in parallel with the first moving bed reactor, in a co-current flow pattern. The second reactor reduces at least a portion of its metal oxide particles and oxidizes the fuel to produce a second syngas stream comprising $H_2$, CO, $CO_2$ and steam. In another embodiment, multiple moving bed reactors, operating in parallel, receive the fuel, $CO_2$ and steam in a co-current flow pattern relative to the metal oxide particles. Each reactor reduces at least a portion of its metal oxide particles to produce reduced metal or reduced metal oxide particles and syngas streams comprising $H_2$, CO, $CO_2$ and steam. The typical operating temperature range of the reducer reactors is between 800° C. and 1190° C. with the pressure range of 1 atm to 10 atm. In certain embodiments, the first syngas stream from the first reducer reaction has a $H_2/CO$ ratio of about 2.9 to about 3.1 and the second syngas stream from the second reducer reactor has a $H_2/CO$ ratio of about 1.0 to about 1.5. In other embodiments, the combination of the syngas streams from each reducer results in a total syngas $H_2/CO$ of about 1 to about 3, preferably 2.

The fuel for this system can be any gaseous hydrocarbon based fuel including but not limited to natural gas, shale gas, and coal-bed methane. In certain embodiments, the fuel is methane. In addition to the specified molar ratio, a steam to hydrocarbon carbon molar ratio between 0.01 and 0.90 is implemented for adjusting the $H_2/CO$ ratio. In certain embodiments, the first and second moving bed reducer reactors have an effective $Fe_2O_3/CH_4$ ratio of about 0.5 to about 1. It should be noted that operating under the specified conditions leads to a unique combination which will maximize the steam conversion to $H_2$, by donating its oxygen to the metal-oxide lattice. In conjunction with the above stated variables, a $CO_2$ to hydrocarbon carbon molar ratio is applied. This uniquely helps the overall syngas quality in terms of limiting the water-gas shift type effects and helps the carbon efficiency improvement significantly. It should also be noted that the above stated conditions create a unique combination and are necessary for the desired hydrocarbon to syngas conversion efficiency. These specific operating conditions along with a unique oxygen carrier and support composition, and heat transfer management yield a system with highly controlled oxygen transfer that ensures the highly efficient generation of the desired syngas quality. All of the gaseous reactants are injected into the top of the co-current moving bed reducer reactor and flow downward along with the metal oxide particles. The design condition for the injection port of these gases is based on giving them enough residence time to obtain a steady state conversion.

A separation unit is connected to each of the multiple reducer reactors and configured to receive the syngas stream from each of the reducer reactors. The separation unit removes the $CO_2$ from each of the syngas streams and controls the $H_2/CO$ ratio by recycling the $CO_2$ from the separation unit to the multiple reducer reactors. Substantially all of the $CO_2$ extracted from the syngas streams is recycled back into the reducer reactors. In certain embodiments having two reducer rectors, the separation unit receives a first syngas stream and a second syngas stream from the first and second reducer reactors. The separation unit extracts $CO_2$ from the first and second syngas streams and sends the $CO_2$-depleted syngas streams downstream for further processing. Substantially all of the separated $CO_2$ is recycled back into the first and second reactors. In certain embodiments, the system is carbon neutral which means that the $CO_2$ input to the reducer reactors equals the $CO_2$ output in syngas from the reducer reactors (CRP=1). In other embodiments, the system is carbon negative which means that the $CO_2$ input to the reducer reactors is greater than the $CO_2$ output in syngas from the reducer reactors (CRP>1).

A combustor reactor, in communication with the multiple reducer reactors, receives the reduced metal oxide particles from the reducer reactors. The combustor reactor regenerates the metal oxide particles by oxidizing the reduced metal oxide particles from the reducer reactors, in the presence of a reducing agent. This reaction is exothermic and is capable of offsetting the endothermic heat requirements in the reducer reactors. The product of the oxidation reaction is oxidized composite metal oxide particles that comprise oxidized metal oxide particles from each of the multiple reducer reactors. The oxidized composite metal oxide particles are recycled back to the multiple reducer reactors to produce additional syngas. The combustor reactor may be a bubbling fluidized reactor. In certain embodiments, the reducing agent is air.

In certain embodiments, the reducer reactor is a moving bed reactor that takes in natural gas and partially oxidizes it to a mixture of CO and $H_2$ using a co-current solids stream of ITCMO. The ITCMO, in the form of $Fe_2TiO_5$, provides oxygen necessary to partially oxidize $CH_4$ to a mixture of CO and $H_2$. In the reducer, the ITCMO is reduced to a mixture of Fe, $FeTiO_3$, and $Fe_3O_4$ depending on the reactor design and contact mode. A co-current moving bed system ensures that, thermodynamic design conditions for a high syngas conversion can be obtained by controlling the reaction stoichiometric and ensuring that sufficient residence time are available for complete reactant conversion. If natural gas is represented by $CH_4$ and the oxidized and reduced ITCMO solids are represented by $FeTi_yO_x$ and $FeTi_yO_{x-1}$ respectively, the target reactions in the reducer reactor can be represented by Equation (1):

$$FeTiyOx + CH_4 \rightarrow FeTi_yO_{x-1} + CO + 2H_2 \text{ Where } \Delta H_{reducer} \geq 0 \quad (1)$$

The design of the reducer reactor is based on an optimal oxygen carrier to fuel ratio, temperature and pressure of the reactor, and the weight ratio of active oxygen carrier to support material. The combustor reactor is a bubbling fluidized bed reactor which reoxidizes the reduced ITCMO particles from the reducer with air. The target reactions in the combustor reactor can be represented by Equation (2):

$$FeTiyO_{1-x} + 0.5O_2 \rightarrow FeTi_yO_x \text{ Where } \Delta H_{reducer} \leq 0 \quad (2)$$

The combustor reaction is exothermic and the heat can be transferred to the reducer reactor using the oxygen carrier to offset the energy requirements for the endothermic heat requirements of the reducer reactor.

The proposed modifications eliminate direct sources of $CO_2$ emissions in the syngas production process. The carbon emission reduction enabled by this process results in a lower environmental impact compared to conventional fossil fuel conversion processes. Carbon efficiency is drastically increased, and what was once a waste stream of the process is now recycled to extinction and also acts as a supplemental feedstock.

3. Examples

The foregoing may be better understood by reference to the following examples, which are presented for purposes of illustration and are not intended to limit the scope of the invention.

Figure 16B:
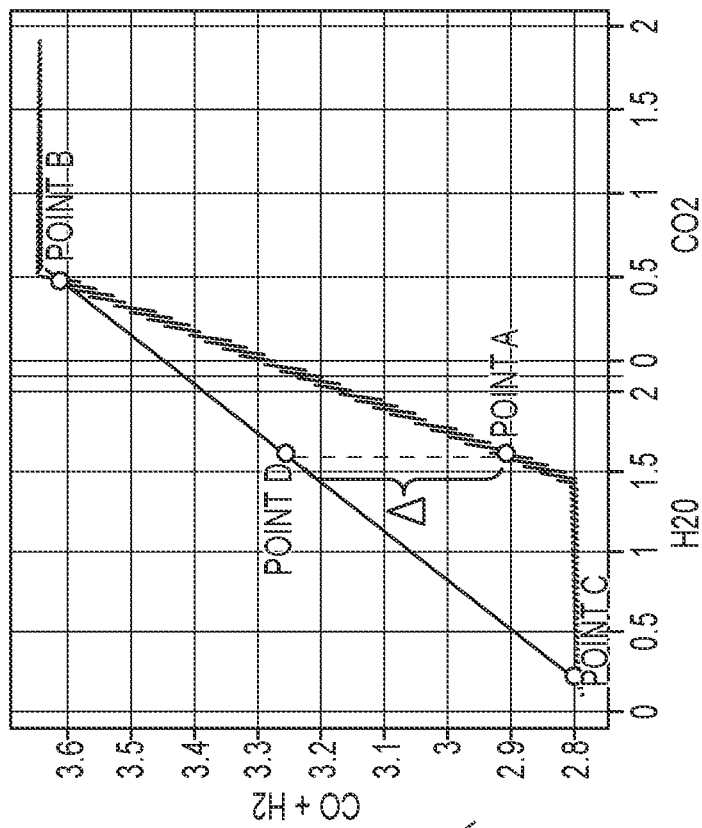
FIG. 16b: Geometric representation of the modularization strategy for the syngas generation performance.
Figure 16A:
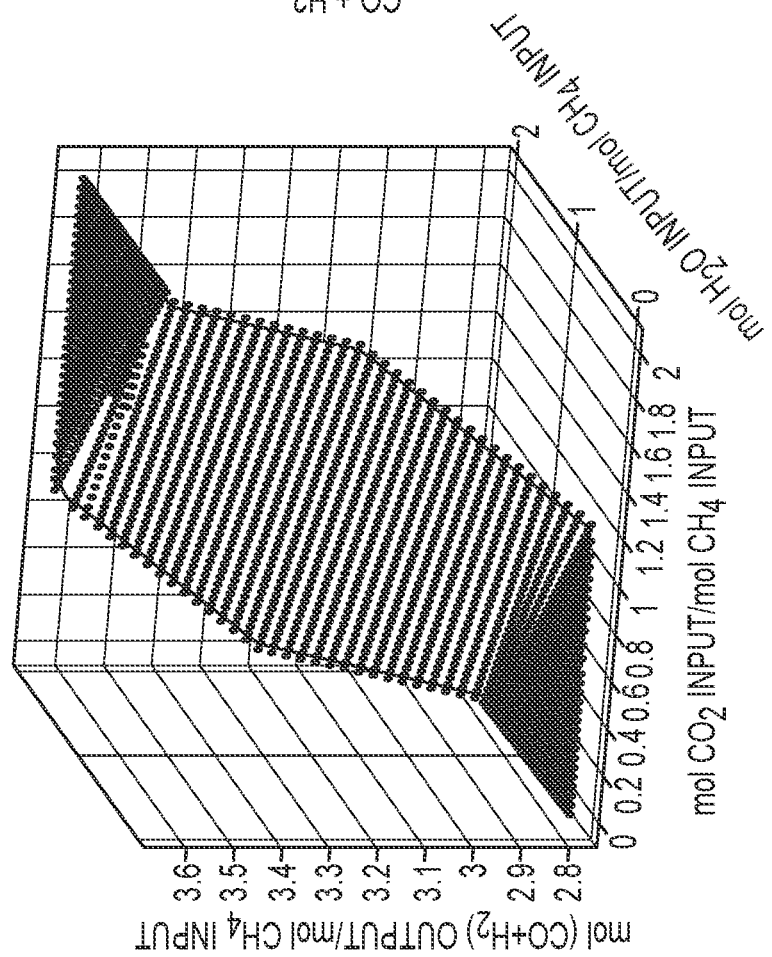
FIG. 16a: Syngas generation surface for pure $Fe_2O_3$ at an $Fe_2O_3:CH_4$ ratio of 0.33.

Example 1: Modularization Design for Syngas Production from 1 Kmol/Hr $CH_4$ Using $Fe_2O_3$, $CO_2$ and $H_2O$ for a Constant $Fe_2O_3$:$CH_4$ Ratio The modularization strategy used in this example is explained using FIG. 16b, which is a co-planar view of FIG. 16a. A 'Point A' is chosen such that it serves as the optimal design conditions for a single reducer syngas-production unit. This point is decomposed into two reducer operating conditions represented by Point B and Point C. The composite syngas generation performance for the points B and C lies along a straight line connecting the two points. Point D represents a composite syngas generation performance for the modular system utilizing the same $H_2O$, $CO_2$ and methane flow rates as that for Point A, but an improvement in syngas yield by '$\Delta$'. The relative splits of natural gas and steam are determined by the ratio of differences in coordinates between Point B and Point C. It should be noted that the line connecting Point B and Point C may have components in all the three dimensions it is plotted on. A specific example for the modular syngas production system is shown in Table 2 (below). The composite Point D for the two reducer modular system shows an 11.8% increase (% $\Delta$) in syngas yield for the same input flows as that for the one reducer system.

TABLE 2

Specific example for the modularization strategy in syngas generation for a constant $Fe_2O_3$:$CH_4$ ratio of 0.333 using $Fe_2O_3$

|  | $CH_4$ | $CO_2$ | $H_2O$ | $Fe_2O_3$ | CO | $H_2$ | CO + $H_2$ | $H_2$:CO |
|---|---|---|---|---|---|---|---|---|
| One Reducer System (Point A) | 1.000 | 0.418 | 1.100 | 0.333 | 1.000 | 1.999 | 2.999 | 2.00 |
| Reactor 1 (Point B) | 0.525 | 0.343 | 1.086 | 0.175 | 0.597 | 1.338 | 1.935 | 2.24 |
| Reactor 2 (Point C) | 0.475 | 0.075 | 0.014 | 0.158 | 0.521 | 0.897 | 1.418 | 1.72 |
| Total of Reactor 1 & Reactor 2 (Point D) | 1.000 | 0.418 | 1.100 | 0.333 | 1.118 | 2.235 | 3.353 | 2.00 |

% increase in syngas production 11.8%

Figure 17:
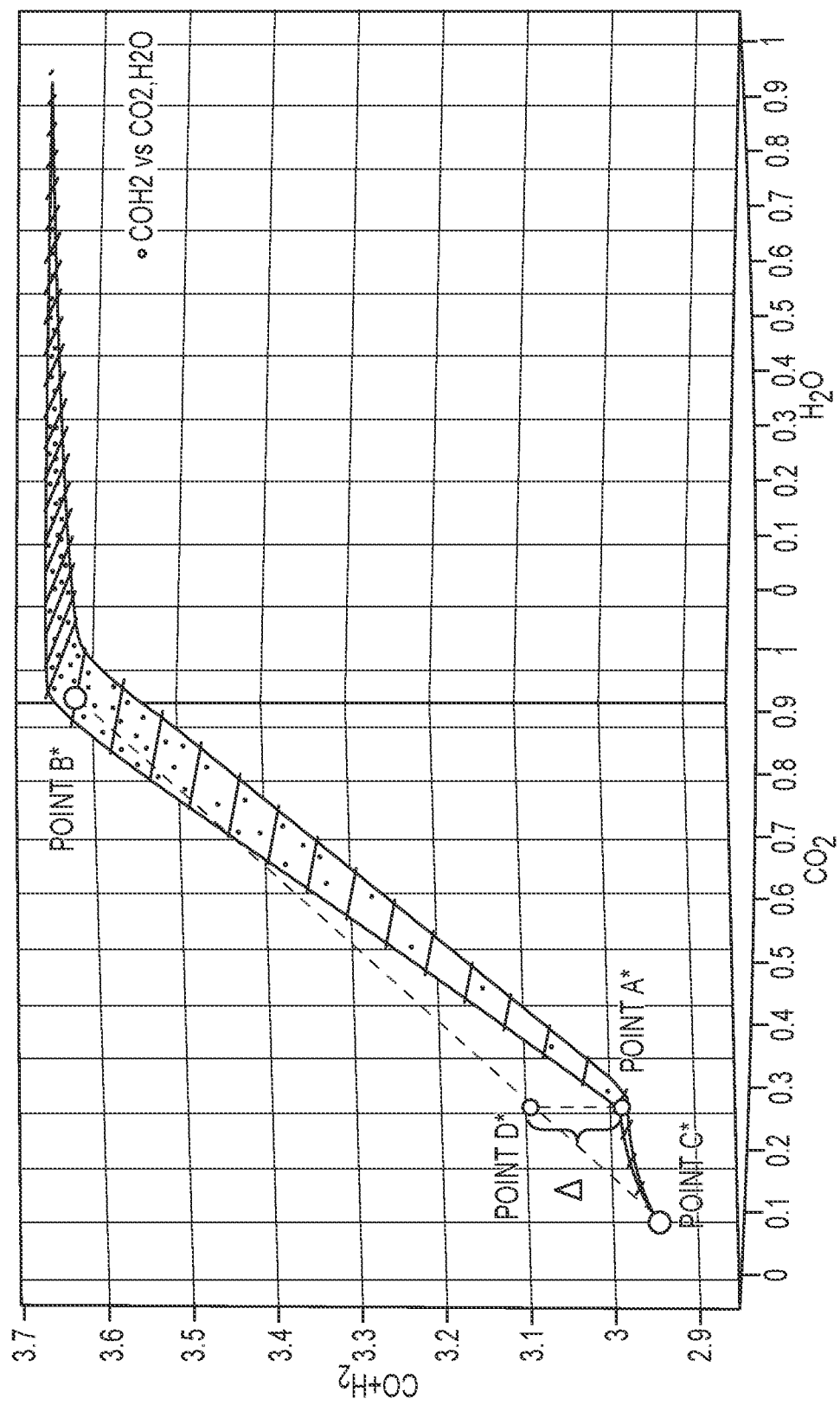
FIG. 17: Syngas generation surface for ITCMO at an $Fe_2O_3:CH_4$ ratio of 0.333.
Figure 18A:
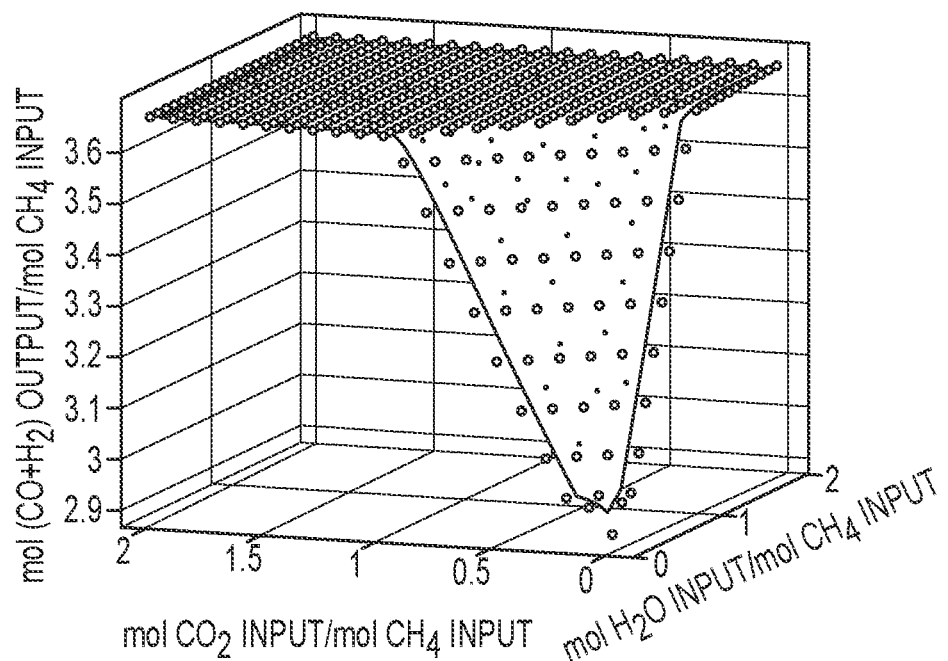
FIG. 18a: Syngas yield at an $Fe_2O_3:CH_4$ ratio of 0.34, 900° C., 1 atm.
Figure 18B:
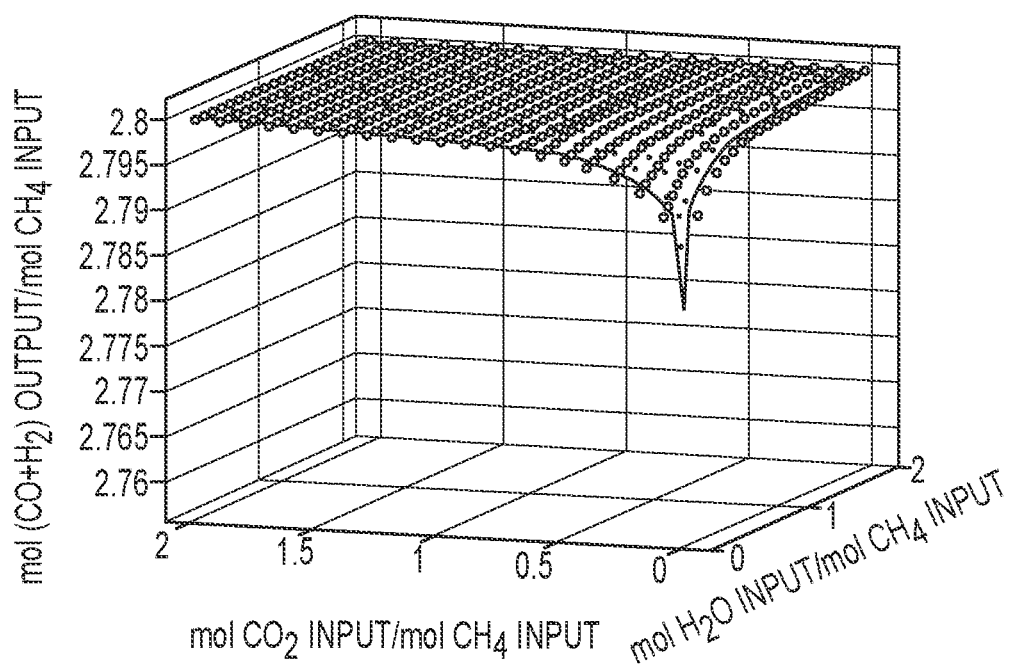
FIG. 18b: Syngas yield at an $Fe_2O_3:CH_4$ ratio of 1.2, 900° C., 1 atm.
Figure 18C:
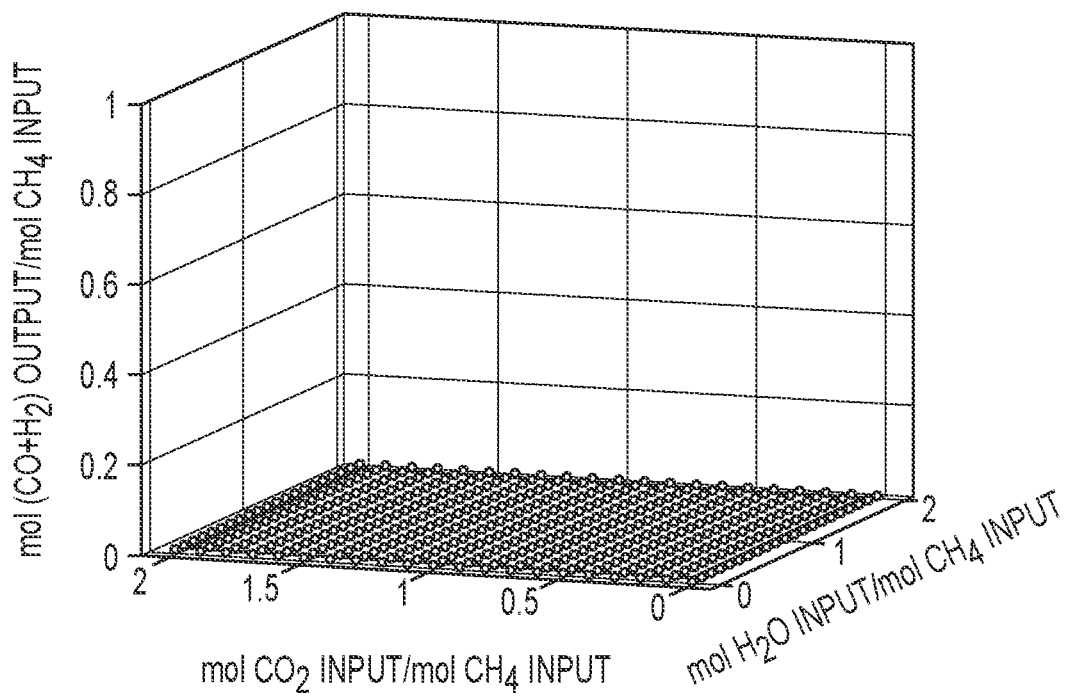
FIG. 18c: Syngas yield at an $Fe_2O_3:CH_4$ ratio of 9.8, 900° C., 1 atm.
Figure 18D:
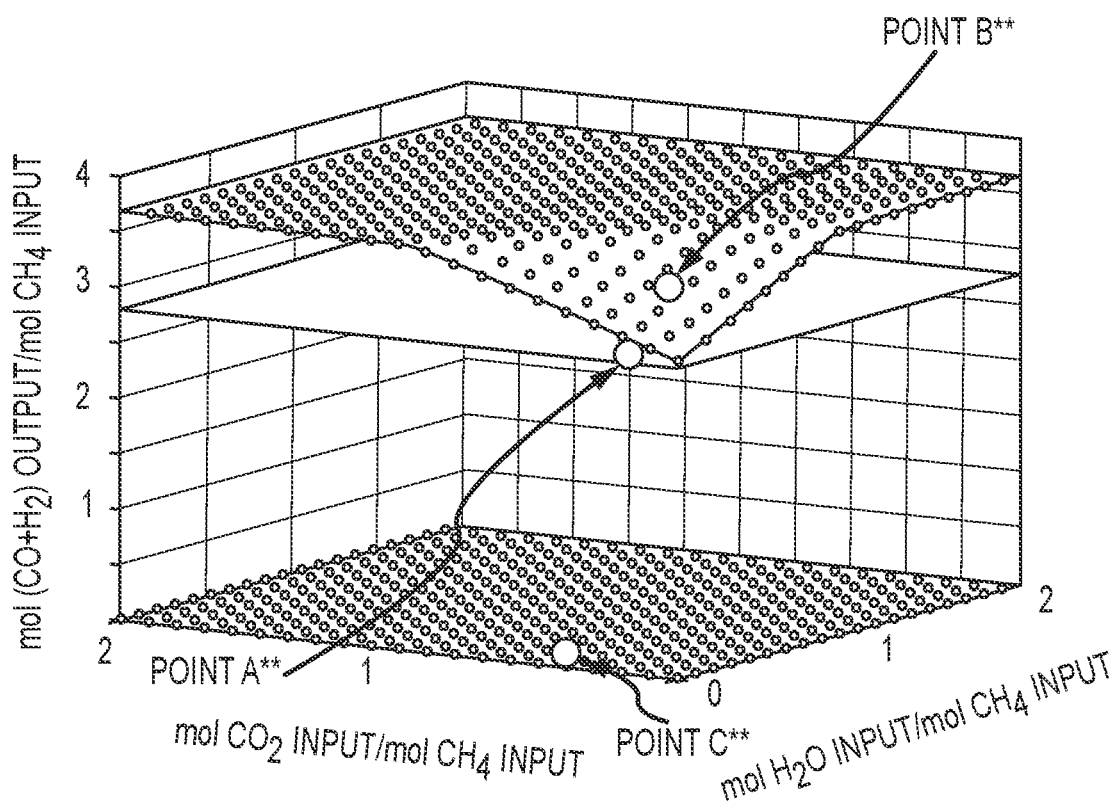
FIG. 18d: Operating points of the ITCMO-based modular system at 900° C., 1 atm for varying $H_2O$ and $CO_2$ injection.

Example 2: Modularization Design for Syngas Production from 1 Kmol/Hr $CH_4$ Using ITCMO, $CO_2$ and $H_2O$ for a Constant $Fe_2O_3$:$CH_4$ Ratio A modularization strategy similar to $Fe_2O_3$ can be applied to ITCMO particles. The motivation for ITCMO modularity can be explained using FIG. 17. A specific example for the modular syngas production system using ITCMO particles is given in Table 3 (below). The single reducer reactor performance (Point A*) is specified by a $CH_4$ input of 1 kmol/hr. Point B* and Point C* represent the operating conditions for the modular reactors with ITCMO. Point D*, the composite of the modular Point B* and Point C*, shows a 2.2% increase (% Δ*) in syngas production with matching inputs as the one reducer system shown in Point A*.

TABLE 3

Specific example for the modularization strategy in syngas generation for a constant $Fe_2O_3$:$CH_4$ ratio of 0.333 using ITCMO

| | $CH_4$ | $CO_2$ | $H_2O$ | $Fe_2O_3$ | CO | $H_2$ | CO + $H_2$ | $H_2$:CO |
|---|---|---|---|---|---|---|---|---|
| One Reducer System (Point A*) | 1.00 | 0.080 | 0.410 | 0.333 | 1.01 | 2.20 | 3.210 | 2.19 |
| Reactor 1 (Point B*) | 0.47 | 0.064 | 0.400 | 0.158 | 0.50 | 1.23 | 1.732 | 2.45 |
| Reactor 2 (Point C*) | 0.52 | 0.016 | 0.010 | 0.175 | 0.52 | 1.03 | 1.548 | 1.95 |
| Total of Reactor 1 & Reactor 2 (Point D*) | 1.00 | 0.080 | 0.410 | 0.333 | 1.02 | 2.25 | 3.280 | 2.19 |

% increase in syngas production 2.2%

Figure 19:
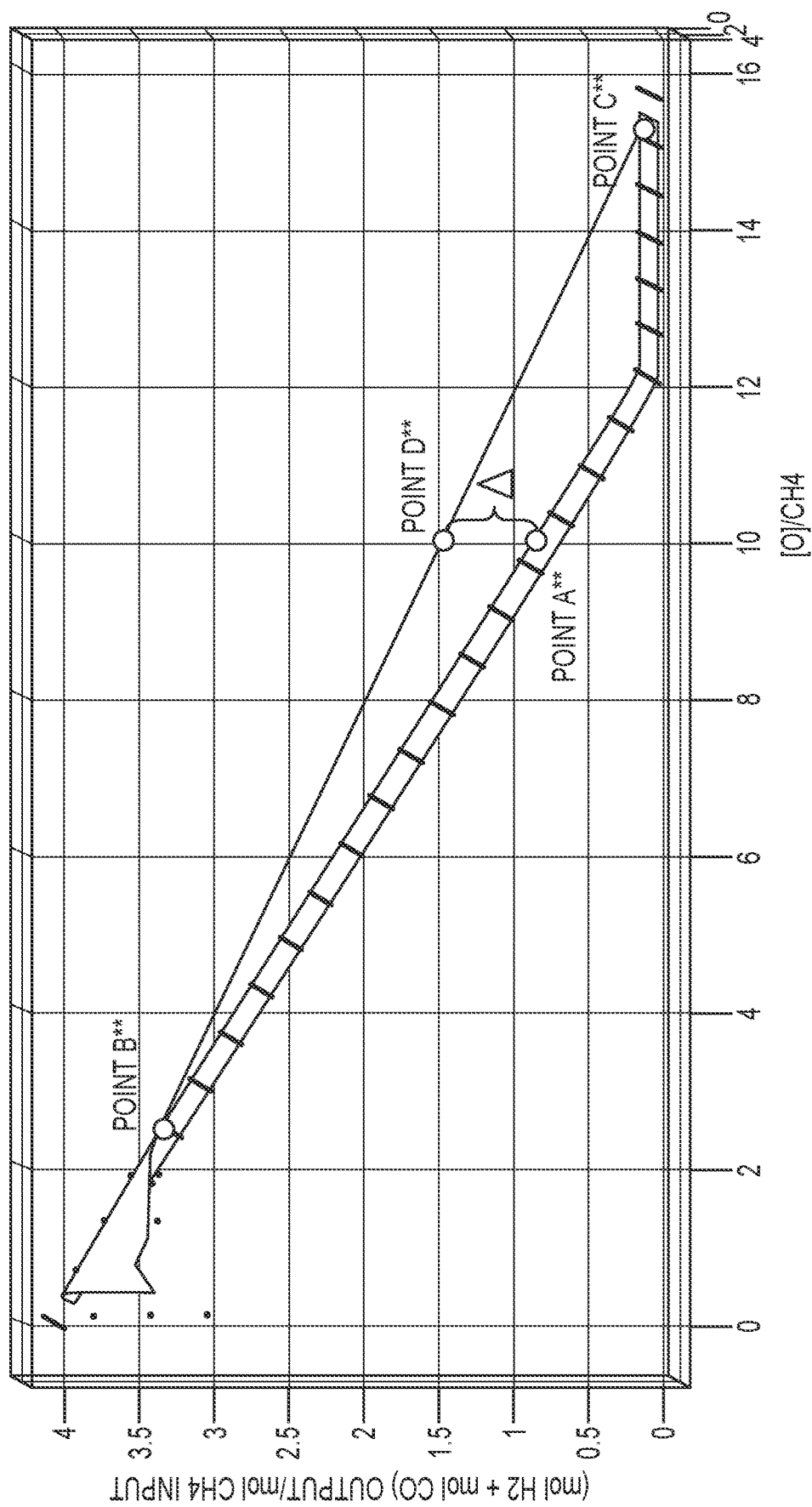
FIG. 19: Co-planar view of FIG. 18d showing the operating points of the ITCMO-based modular system at 900° C., 1 atm for varying $[O]/CH_4$.

Example 3: Modularization Design for Syngas Production from 1 Kmol/Hr $CH_4$ Using ITCMO, $H_2O$ and $CO_2$ for Various $Fe_2O_3$:$CH_4$ Ratios The design approach for the pure $Fe_2O_3$ and the ITCMO cases discussed in example 1 and example 2 show a modularization strategy which operates the two reducer modules at the same $Fe_2O_3$:$CH_4$ molar ratios. This section investigates an example in which a single reducer performance is compared to a modular two-reducer performance, wherein the two reducers operate at different $Fe_2O_3$:$CH_4$ ratios. FIGS. 18a-d show the syngas production performance when the $Fe_2O_3$:$CH_4$ ratio in each reducer reactor is '0.34', '1.2' and '9.8', respectively. The modularization strategy may be applied to this system and is demonstrated by maintaining the same overall inputs as a single reducer system at the operating condition shown in FIG. 18d, Point A. The two reducers are chosen such that one reducer operates at a lower $Fe_2O_3$:$CH_4$ and produces a high syngas yield per mole of methane, Point B, while the second reducer operates at a higher $Fe_2O_3$:$CH_4$ and produces little syngas, Point C. Syngas generation performance is higher at lower $Fe_2O_3$:$CH_4$ molar ratios but comes at a cost of a higher net endothermic reaction as the lattice oxygen content in the system is lower. Thus, Point C maintains the overall heat balance consideration similar to the single reducer case, while Point B produces the majority of the syngas. The comparison between the single reducer and the two reducer modular system are shown in Table 4 (below). The benefits of a modular system are illustrated by the comparison between examples provided in Point A and the modular sum, Point D. The two reducer modular system produces a 19% increase (% Δ) in total syngas yield over the single reducer system for comparable $CH_4$ input, geometrically shown in FIG. 19.

TABLE 4

Specific example for the modularization strategy in syngas generation for a constant $Fe_2O_3$:$CH_4$ ratio of 0.333 using ITCMO

| | Single Reactor (Point A**) | Reactor 1 (Point B**) | Reactor 2 (Point C**) | Modular Sum (Point D**) |
|---|---|---|---|---|
| | Input Conditions: | | | |
| $Fe_2O_3$ | 1.2 | 0.32 | 0.88 | 1.20 |
| $TiO_2$ | 3.6 | 0.95 | 2.65 | 3.60 |
| $CH_4$ | 1 | 0.91 | 0.09 | 1.00 |
| $H_2O$ | 1.05 | 0.82 | 0.23 | 1.05 |
| $CO_2$ | 0.265 | 0.25 | 0.01 | 0.27 |

TABLE 4-continued

Specific example for the modularization strategy in syngas generation for a constant $Fe_2O_3$:$CH_4$ ratio of 0.333 using ITCMO

| | Single Reactor (Point A**) | Reactor 1 (Point B**) | Reactor 2 (Point C**) | Modular Sum (Point D**) |
|---|---|---|---|---|
| | Output Conditions: | | | |
| $CH_4$ | $2.1*10^{-4}$ | 0.00 | 0.00 | 0.00 |
| $H_2O$ | 1.12 | 0.36 | 0.41 | 0.77 |
| CO | 0.87 | 1.04 | 0.00 | 1.04 |
| $CO_2$ | 0.39 | 0.12 | 0.10 | 0.23 |
| $H_2$ | 1.92 | 2.28 | 0.00 | 2.28 |
| $H_2$ + CO | 2.79 | 3.32 | 0.0 | 3.32 |
| $H_2$:CO | 2.19 | 2.20 | 0.0 | 2.20 |

% increase in syngas production = 19% (% Δ**)

REFERENCES

1. "How Much Petroleum Does the United States Import and from Where?" *U.S. Energy Information Administration—EIA—Independent Statistics and Analysis*. U.S. Department of Energy. Web.
2. "Annual Energy Outlook 2015 with Projections to 2040." *U.S. Energy Information Administration—EIA—Independent Statistics and Analysis*. U.S. Department of Energy, April 2015.
3. "Natural Gas Vented and Flared." *U.S. Energy Information Administration—EIA—Independent Statistics and Analysis*. U.S. Department of Energy, 29 Feb. 2016. Web.
4. "Natural Gas Weekly Update." *U.S. Energy Information Administration—EIA—Independent Statistics and Analysis*. U.S. Department of Energy. Web.
5. Arno, De Klerk. "Gas-to-Liquid Conversion." *Natural Gas Conversion Technologies Workshop of ARPA-E*. U.S. Department of Energy, Houston, Tex. Vol 13 (2012).

6. "Quality Guidelines for Energy System Studies—Specification for Selected Feedstocks." *National Energy Technology Laboratory.* U.S. Department of Energy, January 2012.

What is claimed is:

1. A system for converting a fuel, the system comprising:
a first moving bed reactor comprising a metal oxide particles having a primary component and a secondary component, wherein fuel, $CO_2$ and steam are added to the first moving bed reactor in a co-current flow pattern relative to the metal oxide particles, wherein the first moving bed reactor is configured to reduce at least a portion of the metal oxide particles with the fuel to produce a first reduced metal oxide, and is further configured to produce a first syngas stream comprising $H_2$, CO, $CO_2$ and steam;
a second moving bed reactor, operating in parallel with the first moving bed reactor and comprising metal oxide particles having a primary component and a secondary component, wherein fuel, $CO_2$ and steam are added to the second moving bed reactor in a co-current flow pattern relative to the metal oxide particles, wherein the second moving bed reactor is configured to reduce at least a portion of the metal oxide particles with the fuel to produce a second reduced metal oxide, and is further configured to produce a second syngas stream comprising $H_2$, CO, $CO_2$ and steam;
a separation unit, in communication with the first moving bed reactor and the second moving bed reactor, and configured to remove the $CO_2$ from the first syngas stream and the second syngas stream, wherein the $H_2$/CO ratios of the first and second syngas streams are controlled by recycling substantially all of the $CO_2$ from the separation unit to the first moving bed reactor and the second moving bed reactor; and
a third co-current fluidized bed reactor in communication with the first moving bed reactor and the second moving bed reactor and configured to oxidize the first reduced metal oxide and the second reduced metal oxide with an oxidizing agent to produce oxidized metal oxide particles and recycle the oxidized metal oxide particles to the first moving bed reactor and the second moving bed reactor for subsequent reduction reactions.

2. The system of claim 1, wherein the primary component is $Fe_2O_3$.

3. The system of claim 1, wherein the secondary component comprises a metal-oxide selected from the group consisting of oxides of Ti, Al, Co, Cu, Mg, Mn, Zn, and combinations thereof.

4. The system of claim 1, wherein the secondary component is titanium oxide.

5. The system of claim 1, wherein the fuel is methane.

6. The system of claim 1, wherein the $H_2$/CO ratio of the first syngas stream is about 2.9 to about 3.1.

7. The system of claim 1, wherein the $H_2$/CO ratio of the second syngas stream is about 1.0 to about 1.5.

8. The system of claim 1, wherein a combination of the syngas from the first moving bed reactor and the second moving bed reactor results in a total syngas $H_2$/CO ratio of about 1 to about 3.

9. The system of claim 1, wherein the first reduced metal oxides and the second reduced metal oxides are oxidized by introducing steam into the third co-current fluidized bed reactor.

10. The system of claim 1, wherein the system consumes more $CO_2$ than it produces.

* * * * *